(12) United States Patent
Lu

(10) Patent No.: US 9,928,215 B1
(45) Date of Patent: *Mar. 27, 2018

(54) ITERATIVE SIMPLE LINEAR REGRESSION COEFFICIENT CALCULATION FOR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/981,152

(22) Filed: Dec. 28, 2015

Related U.S. Application Data

(60) Provisional application No. 62/126,445, filed on Feb. 28, 2015.

(51) Int. Cl.
*G06F 1/02* (2006.01)
*G06F 17/18* (2006.01)

(52) U.S. Cl.
CPC .................. *G06F 17/18* (2013.01)

(58) Field of Classification Search
CPC ............ G06F 17/17; G06F 1/32; G06F 17/18
USPC ....................................................... 708/274
See application file for complete search history.

(56) References Cited

U.S. PATENT DOCUMENTS

| | | | |
|---|---|---|---|
| 6,928,434 B1 * | 8/2005 | Choi | G06Q 20/207 |
| 7,747,413 B2 | 6/2010 | Ramsey et al. | |
| 7,840,377 B2 | 11/2010 | Ramsey et al. | |
| 9,069,726 B2 | 6/2015 | Lu | |
| 2002/0091707 A1 * | 7/2002 | Keller | G06F 17/3061 |
| 2003/0176931 A1 * | 9/2003 | Pednault | G06F 17/30539 700/31 |
| 2006/0074611 A1 * | 4/2006 | Wong | G03F 7/70633 703/2 |
| 2008/0201117 A1 * | 8/2008 | Wong | G06F 17/5009 703/2 |
| 2014/0164456 A1 | 6/2014 | Lu | |

FOREIGN PATENT DOCUMENTS

| | | | |
|---|---|---|---|
| WO | WO-2014093540 A2 | 6/2014 | |
| WO | WO-2014093540 A3 | 9/2014 | |

* cited by examiner

*Primary Examiner* — Tan V. Mai

(57) ABSTRACT

Methods, systems, and computing system program products for iteratively calculating Simple Linear Regression (SLR) coefficients for streamed data, including iteratively calculating one or more components of SLR coefficients for an adjusted computation window based on one or more components of SLR coefficients calculated for a pre-adjusted computation window and then calculating the SLR coefficients for the adjusted computation window based on the iteratively calculated components. Iteratively calculating SLR coefficients avoids visiting all data elements in the adjusted computation window and performing redundant computations thereby increasing calculation efficiency, saving computing resources and reducing computing system's power consumption.

20 Claims, 26 Drawing Sheets

The Definitions of Simple Linear Regression Coefficients:

Suppose computation window $XY$ composes of $n$ pairs of data elements: $XY = \{(x_i, y_i) | i = 1, \ldots, n\}$, where data elements $x_1, x_2, x_3, x_4, \ldots\ldots, x_n$ are observed data from a predictor variable $X$ and data elements $y_1, y_2, y_3, y_4, \ldots\ldots, y_n$ are observed data from a response variable $Y$, simple linear regression coefficients for $XY$ need to be calculated.

A simple linear regression model is defined as $$Y = \beta 0 + \beta 1 X + \varepsilon$$

The relationship between Y and X can be described by a fitted regression line $\hat{Y} = b0 + b1X$. The estimates $b1$ and $b0$ are called simple linear regression coefficients and can be calculated using following equations:

$$b1 = \frac{\sum_1^n (x_i - \bar{x}_k)(y_i - \bar{y}_k)}{\sum_1^n (x_i - \bar{x}_k)^2} \qquad 401$$

$$b0 = \bar{y}_k - b1\bar{x}_k \qquad 402$$

Define the sums of $X$ with size $n$ and $Y$ with size $n$ in the $k^{th}$ iteration respectively as below:

$$XS_k = x_1 + x_2 + x_3 + \cdots + x_n = \sum_1^n x_i \qquad 403$$

$$YS_k = y_1 + y_2 + y_3 + \cdots + y_n = \sum_1^n y_i \qquad 404$$

Define the means of $X$ with size $n$ and $Y$ with size $n$ in the $k^{th}$ iteration respectively as below:

$$\bar{x}_k = \frac{(x_1 + x_2 + x_3 + \cdots + x_n)}{n} = \frac{\sum_1^n x_i}{n} \qquad 405$$

$$\bar{y}_k = \frac{(y_1 + y_2 + y_3 + \cdots + y_n)}{n} = \frac{\sum_1^n y_i}{n} \qquad 406$$

Fig. 4A

The simple linear regression coefficients for $X$ with size $n$ and $Y$ with size $n$ in the $k^{th}$ iteration are defined as:

$$b1_k = \frac{\sum_1^n(x_i - \bar{x}_k)(y_i - \bar{y}_k)}{\sum_1^n(x_i - \bar{x}_k)^2} \qquad \frown\!\!\smile 407$$

$$b0_k = \bar{y}_k - b1_k \bar{x}_k \qquad \frown\!\!\smile 408$$

Suppose $b1$ and $b0$ in the simple linear regression equation for the computation window $XY$ with a fixed size $n$ have already been calculated, and they need to be calculated again after the least recently received pair of data elements $(x_r, y_r)$ in $XY$ is removed and a new pair of data elements $(x_a, y_a)$ is added.

Define the sums and means of $X$ with size $n$ and $Y$ with size $n$ in the $k+1^{th}$ iteration respectively as below:

$$XS_{k+1} = x_1 + x_2 + x_3 + \cdots + x_n + x_a - x_r = \sum_1^n x_i + x_a - x_r \qquad \frown\!\!\smile 409$$

$$YS_{k+1} = y_1 + y_2 + y_3 + \cdots + y_n + y_a - y_r = \sum_1^n y_i + y_a - y_r \qquad \frown\!\!\smile 410$$

$$\bar{x}_{k+1} = \frac{(x_1 + x_2 + \cdots + x_n + x_a - x_r)}{n} = \frac{\sum_1^n x_i + x_a - x_r}{n} \qquad \frown\!\!\smile 411$$

$$\bar{y}_{k+1} = \frac{(y_1 + y_2 + \cdots + y_n + y_a - y_r)}{n} = \frac{\sum_1^n y_i + y_a - y_r}{n} \qquad \frown\!\!\smile 412$$

The simple linear regression coefficients of the adjusted $X$ with size $n$ and adjusted $Y$ with size $n$ in the $k+1^{th}$ iteration are defined as:

$$b1_{k+1} = \frac{\sum_1^n(x_i - \bar{x}_{k+1})(y_i - \bar{y}_{k+1}) + (x_a - \bar{x}_{k+1})(y_a - \bar{y}_{k+1}) - (x_r - \bar{x}_{k+1})(y_r - \bar{y}_{k+1})}{\sum_1^n(x_i - \bar{x}_{k+1})^2 + (x_a - \bar{x}_{k+1})^2 - (x_r - \bar{x}_{k+1})^2} \qquad \frown\!\!\smile 413$$

$$b0_{k+1} = \bar{y}_{k+1} - b1_{k+1} \bar{x}_{k+1} \qquad \frown\!\!\smile 414$$

Fig. 4A Cont'd

Some Example Components of Simple Linear Regression Coefficients:

- $XS_k = \sum_1^n x_i$
- $YS_k = \sum_1^n y_i$
- $\bar{x}_k = \frac{XS_k}{n} = \frac{1}{n}\sum_1^n x_i$
- $\bar{y}_k = \frac{YS_k}{n} = \frac{1}{n}\sum_1^n y_i$
- $XSS_k = \sum_1^n x_i^2$
- $XV_k = \sum_1^n x_i^2 - n\bar{x}_k^2 = XSS_k - \frac{XS_k^2}{n} = XSS_k - n\bar{x}_k^2$
- $SSDX_k = \sum_1^n (x_i - \frac{XS_k}{n})^2 = \sum_1^n (x_i - \bar{x}_k)^2$
- $SDXY_k = \sum_1^n (x_i - \bar{x}_k)(y_i - \bar{y}_k) = \sum_1^n (x_i - \frac{XS_k}{n})(y_i - \bar{y}_k) = \sum_1^n (x_i - \bar{x}_k)(y_i - \frac{YS_k}{n}) = \sum_1^n (x_i - \frac{XS_k}{n})(y_i - \frac{YS_k}{n})$
- $SXY_k = \sum_1^n x_i y_i$
- $x\sigma_k^2 = \frac{\sum_1^n x_i^2}{n} - \bar{x}_k^2 = \frac{\sum_1^n x_i^2}{n} - \left(\frac{XS_k}{n}\right)^2$
- $b1_k = \frac{\sum_1^n (x_i - \bar{x}_k)(y_i - \bar{y}_k)}{\sum_1^n (x_i - \bar{x}_k)^2} = \frac{\sum_1^n (x_i - \frac{XS_k}{n})(y_i - \bar{y}_k)}{\sum_1^n (x_i - \frac{XS_k}{n})^2} = \frac{\sum_1^n (x_i - \bar{x}_k)(y_i - \frac{YS_k}{n})}{\sum_1^n (x_i - \bar{x}_k)^2} = \frac{\sum_1^n (x_i - \frac{XS_k}{n})(y_i - \frac{YS_k}{n})}{\sum_1^n (x_i - \frac{XS_k}{n})^2}$
- $b0_k = \frac{YS_k}{n} - b1_k \frac{XS_k}{n} = \frac{YS_k}{n} - b1_k \bar{x}_k = \bar{y}_k - b1_k \frac{XS_k}{n} = \bar{y}_k - b1_k \bar{x}_k$ Basic Iterative Component Calculation Equations:

The sum and/or the mean of the data within the a computation window will be used by several examples of iterative algorithms described in the following sections, so the equations are put here instead of in each algorithms.

$XS_{k+1} = XS_k + x_a - x_r$     415

$YS_{k+1} = YS_k + y_a - y_r$     416

$\bar{x}_{k+1} = \bar{x}_k + \frac{x_a - x_r}{n}$     417

$\bar{y}_{k+1} = \bar{y}_k + \frac{y_a - y_r}{n}$     418

Fig. 4B

Iterative Algorithm 1:

Simple linear regression coefficients can be iteratively calculated based on the components $XS_k$ or $\bar{x}_k$, $YS_k$ or $\bar{y}_k$, $XS_{k+1}$ or $\bar{x}_{k+1}$ and $YS_{k+1}$ or $\bar{y}_{k+1}$ defined in Figure 4A and Figure 4B and components $SXY_{k+1}$, and $XV_{k+1}$ defined below.

$$XSS_k = \sum_1^n x_i^2 \qquad \text{419}$$

$$XSS_{k+1} = \sum_1^n x_i^2 + x_a^2 - x_r^2 \qquad \text{420}$$

$XSS_{k+1}$ can be easily calculated in an iterative way:

$$XSS_{k+1} = XSS_k + x_a^2 - x_r^2 \qquad \text{421}$$

$$XV_k = XSS_k - \frac{XS_k^2}{n} = XSS_k - n\bar{x}_k^2 \qquad \text{422}$$

$$XV_{k+1} = XSS_{k+1} - \frac{XS_{k+1}^2}{n} = XSS_{k+1} - n\bar{x}_{k+1}^2 \qquad \text{423}$$

$$SXY_k = \sum_1^n x_i y_i \qquad \text{424}$$

$$SXY_{k+1} = \sum_1^n x_i y_i + x_a y_a - x_r y_r \qquad \text{425}$$

$SXY_{k+1}$ can be calculated in an iterative way:

$$SXY_{k+1} = SXY_k + x_a y_a - x_r y_r \qquad \text{426}$$

Once $XS_{k+1}$ or $\bar{x}_{k+1}$, $YS_{k+1}$ or $\bar{y}_{k+1}$, $SXY_{k+1}$, and $XV_{k+1}$ are calculated, then simple linear regression coefficients can be calculated by $$b1_{k+1} = \frac{SXY_{k+1} - n\cdot\bar{x}_{k+1}\cdot\bar{y}_{k+1}}{XV_{k+1}} = \frac{SXY_{k+1} - XS_{k+1}\cdot\bar{y}_{k+1}}{XV_{k+1}} = \frac{SXY_{k+1} - \bar{x}_{k+1}\cdot YS_{k+1}}{XV_{k+1}} = \frac{SXY_{k+1} - XS_{k+1}\cdot YS_{k+1}/n}{XV_{k+1}}$$

427

$$b0_{k+1} = \frac{YS_{k+1}}{n} - b1_{k+1}\bar{x}_{k+1} = \bar{y}_{k+1} - b1_{k+1}\frac{XS_{k+1}}{n} = \frac{(YS_{k+1} - b1_{k+1}XS_{k+1})}{n} = \bar{y}_{k+1} - b1_{k+1}\bar{x}_{k+1}$$

Iterative Algorithm 2:

Simple linear regression coefficients can be calculated based on components $XS_{k+1}$ or $\bar{x}_{k+1}$ and $YS_{k+1}$ or $\bar{y}_{k+1}$ defined in Figure 4B and $SSDX_{k+1}$, $SDXY_{k+1}$ defined below.

$SSDX_k = \sum_1^n (x_i - \bar{x}_k)^2$ ⌒╲╱429

$SSDX_{k+1} = \sum_1^n (x_i - \bar{x}_{k+1})^2 + (x_a - \bar{x}_{k+1})^2 - (x_r - \bar{x}_{k+1})^2$ ⌒╲╱430

$SSDX_{k+1}$ can be calculated in an iterative way:

$SSDX_{k+1} = SSDX_k + (x_a - x_r)((x_r + x_a) - (XS_k + XS_{k+1})/n) = SSDX_k + (x_a - x_r)((x_r + x_a) - (\bar{x}_k + \bar{x}_{k+1}))$ ⌒╲╱431

$SDXY_k = \sum_1^n (x_i - \bar{x}_k)(y_i - \bar{y}_k)$ ⌒╲╱432

$SDXY_{k+1} = \sum_1^n (x_i - \bar{x}_{k+1})(y_i - \bar{y}_{k+1}) + (x_a - \bar{x}_{k+1})(y_a - \bar{y}_{k+1}) - (x_r - \bar{x}_{k+1})(y_r - \bar{y}_{k+1})$
⌒╲╱433

$SDXY_{k+1}$ can be calculated in an iterative way by using $XS_{k+1}$ or $\bar{x}_{k+1}$, $YS_{k+1}$ or $\bar{y}_{k+1}$, $SDXY_k$:

$SDXY_{k+1} = SDXY_k + (y_a - YS_k/n)(x_a - x_r) + (y_a - y_r)(x_r - \bar{x}_{k+1}) = SDXY_k + (y_a - \bar{y}_k)(x_a - x_r) + (y_a - y_r)(x_r - XS_{k+1}/n) = SDXY_k + (y_a - YS_k/n)(x_a - x_r) + (y_a - y_r)(x_r - XS_{k+1}/n) = SDXY_k + (y_a - \bar{y}_k)(x_a - x_r) + (y_a - y_r)(x_r - \bar{x}_{k+1}) = SDXY_k + (x_a - XS_k/n)(y_a - y_r) + (x_a - x_r)(y_r - \bar{y}_{k+1}) = SDXY_k + (x_a - \bar{x}_k)(y_a - y_r) + (x_a - x_r)(y_r - YS_{k+1}/n) = SDXY_k + (x_a - XS_k/n)(y_a - y_r) + (x_a - x_r)(y_r - YS_{k+1}/n) = SDXY_k + (x_a - \bar{x}_k)(y_a - y_r) + (x_a - x_r)(y_r - \bar{y}_{k+1})$
⌒╲╱434

Once $SSDX_{k+1}$ and $SDXY_{k+1}$ is calculated, then $b1_{k+1} = \frac{SDXY_{k+1}}{SSDX_{k+1}}$ ⌒╲╱435

$b0_{k+1} = \frac{YS_{k+1}}{n} - b1_{k+1}\bar{x}_{k+1} = \bar{y}_{k+1} - b1_{k+1}\frac{XS_{k+1}}{n} = \frac{(YS_{k+1} - b1_{k+1}XS_{k+1})}{n} = \bar{y}_{k+1} - b1_{k+1}\bar{x}_{k+1}$
⌒╲╱436

Fig. 4D

Iterative Algorithm 3:

Simple linear regression coefficients can be calculated based on components $XS_{k+1}$ or $\bar{x}_{k+1}$ and $YS_{k+1}$ or $\bar{y}_{k+1}$ defined in Figure 4B and $XSS_{k+1}$, $SXY_{k+1}$ defined below.

$XSS_k = \sum_1^n x_i^2$ ⌢⌣437

$XSS_{k+1} = \sum_1^n x_i^2 + x_a^2 - x_r^2$ ⌢⌣438

$XSS_{k+1}$ can be easily calculated in an iterative way:

$XSS_{k+1} = XSS_k + x_a^2 - x_r^2$ ⌢⌣439

$SXY_k = \sum_1^n x_i y_i$ ⌢⌣440

$SXY_{k+1} = \sum_1^n x_i y_i + x_a y_a - x_r y_r$ ⌢⌣441

$SXY_{k+1}$ can be easily calculated in an iterative way:

$SXY_{k+1} = SXY_k + x_a y_a - x_r y_r$ ⌢⌣442

Once $XS_{k+1}$ or $\bar{x}_{k+1}$, $YS_{k+1}$ or $\bar{y}_{k+1}$, $XSS_{k+1}$, $YSS_{k+1}$ and $SXY_{k+1}$ are calculated, then simple linear regression coefficients can be calculated by $b1_{k+1} = \frac{SXY_{k+1} - XS_{k+1} \cdot \bar{y}_{k+1}}{XSS_{k+1} - XS_{k+1}^2/n} = \frac{SXY_{k+1} - \bar{x}_{k+1} \cdot YS_{k+1}}{XSS_{k+1} - n \cdot \bar{x}_{k+1}^2} = \frac{SXY_{k+1} - XS_{k+1} \cdot YS_{k+1}/n}{XSS_{k+1} - XS_{k+1}^2/n} = \frac{n \cdot SXY_{k+1} - XS_{k+1} \cdot YS_{k+1}}{n \cdot XSS_{k+1} - XS_{k+1}^2} = \frac{SXY_{k+1} - n \cdot \bar{x}_{k+1} \cdot \bar{y}_{k+1}}{XSS_{k+1} - n \cdot \bar{x}_{k+1}^2}$ ⌢⌣443

$b0_{k+1} = \frac{YS_{k+1}}{n} - b1_{k+1} \bar{x}_{k+1} = \bar{y}_{k+1} - b1_{k+1} \frac{XS_{k+1}}{n} = \frac{(YS_{k+1} - b1_{k+1} XS_{k+1})}{n} = \bar{y}_{k+1} - b1_{k+1} \bar{x}_{k+1}$ ⌢⌣444

Fig. 4E

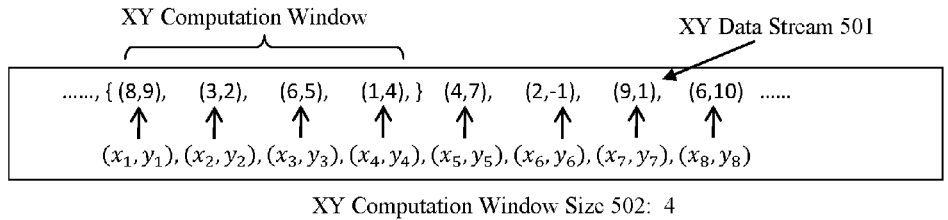

XY Computation Window Size 502: 4

Calculate Linear Regression Coefficients for XY Computation Window 503

Traditional Algorithm:

1. Use equations 405 and 406 to calculate the means of X variable and Y variable in XY computation window 503 respectively:

$$\bar{x}_1 = \frac{8+3+6+1}{4} = \frac{18}{4} = 4.5 \qquad \bar{y}_1 = \frac{9+2+5+4}{4} = \frac{20}{4} = 5$$

Operations in this step: 2 divisions, 6 additions

2. Calculate $\sum_1^4 (x_i - \bar{x}_1)(y_i - \bar{y}_1)$ for the 1st iteration:

$\sum_1^4 (x_i - \bar{x}_1)(y_i - \bar{y}_1) = (8 - 4.5)(9 - 5) + (3 - 4.5)(2 - 5) + (6 - 4.5)(5 - 5) + (1 - 4.5)(4 - 5) = 14 + 4.5 + 0 + 3.5 = 22$ Operations in this step: 4 multiplications, 3 additions, 8 subtractions 3. Calculate $\sum_1^4 (x_i - \bar{x}_1)^2$ for the 1st iteration:

$\sum_1^4 (x_i - \bar{x}_1)^2 = (8 - 4.5)^2 + (3 - 4.5)^2 + (6 - 4.5)^2 + (1 - 4.5)^2 = 29$ Operations in this step: 4 multiplications, 3 additions, 4 subtractions 4. Calculate $b1_1 = \frac{\sum_1^4 (x_i - \bar{x}_1)(y_i - \bar{y}_1)}{\sum_1^4 (x_i - \bar{x}_1)^2}$ for the 1st iteration:

$$b1_1 = \frac{\sum_1^4 (x_i - \bar{x}_1)(y_i - \bar{y}_1)}{\sum_1^4 (x_i - \bar{x}_1)^2} = \frac{22}{29} = 0.7586206896551724$$

Operations in this step: 1 division

5. Calculate $b0_1 = \bar{y}_1 - b1_1 \bar{x}_1$ for the 1st iteration:

$b0_1 = \bar{y}_1 - b1_1 \bar{x}_1 = 5 - 0.7586206896551724 \times 4.5 = 5 - 3.4137931034482759 = 1.5862068965517241$ Operations in this step: 1 multiplication, 1 subtraction There are a total of 3 divisions, 9 multiplications, 12 additions and 13 subtractions.

Fig. 5A

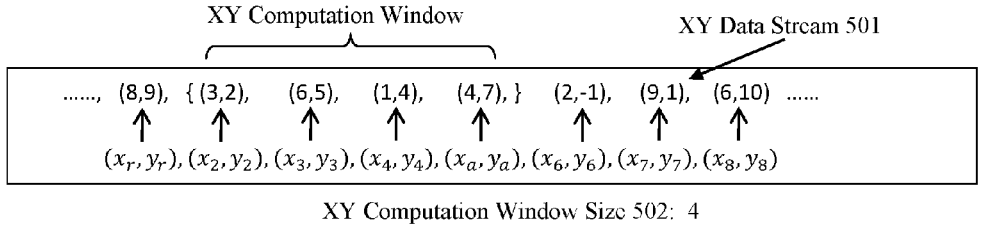

XY Computation Window Size 502: 4

Calculate Linear Regression Coefficients for *XY* Computation Window 504

Traditional Algorithm:

1. Use equations 405 and 406 to calculate the means of X variable and Y variable in XY computation window 504 respectively:

$$\bar{x}_2 = \frac{3+6+1+4}{4} = \frac{14}{4} = 3.5 \qquad \bar{y}_2 = \frac{2+5+4+7}{4} = \frac{18}{4} = 4.5$$

Operations in this step: 2 divisions, 6 additions

2. Calculate $\sum_2^4 (x_i - \bar{x}_2)(y_i - \bar{y}_2) + (x_a - \bar{x}_2)(y_a - \bar{y}_2)$ $\sum_2^4 (x_i - \bar{x}_2)(y_i - \bar{y}_2) + (x_a - \bar{x}_2)(y_a - \bar{y}_2) = (3 - 3.5)(2 - 4.5) + (6 - 3.5)(5 - 4.5) + (1 - 3.5)(4 - 4.5) + (4 - 3.5)(7 - 4.5) = 1.25 + 1.25 + 1.25 + 1.25 = 5$ Operations in this step: 4 multiplications, 3 additions, 8 subtractions 3. Calculate $\sum_2^4 (x_i - \bar{x}_2)^2 + (x_a - \bar{x}_2)^2$ $\sum_2^4 (x_i - \bar{x}_2)^2 + (x_a - \bar{x}_2)^2 = (3 - 3.5)^2 + (6 - 3.5)^2 + (1 - 3.5)^2 + (4 - 3.5)^2 = 13$ Operations in this step: 4 multiplications, 3 additions, 4 subtractions 4. Calculate $b1_2 = \frac{\sum_2^4 (x_i - \bar{x}_2)(y_i - \bar{y}_2) + (x_a - \bar{x}_2)(y_a - \bar{y}_2)}{\sum_2^4 (x_i - \bar{x}_2)^2 + (x_a - \bar{x}_2)^2}$ $b1_2 = \frac{\sum_2^4 (x_i - \bar{x}_2)(y_i - \bar{y}_2) + (x_a - \bar{x}_2)(y_a - \bar{y}_2)}{\sum_2^4 (x_i - \bar{x}_2)^2 + (x_a - \bar{x}_2)^2} = \frac{5}{13} = 0.3846153846153846$ Operations in this step: 1 division 6. Calculate $b0_2 = \bar{y}_2 - b1_2 \bar{x}_2$ for the 2$^{nd}$ iteration:

$b0_2 = \bar{y}_2 - b1_2 \bar{x}_2 = 4.5 - 0.3846153846153846 \times 3.5 = 4.5 - 1.3461538461538461 = 3.1538461538461539$ Operations in this step: 1 multiplication, 1 subtraction There are a total of 3 divisions, 9 multiplications, 12 additions and 13 subtractions.

Fig. 5A Cont'd 1

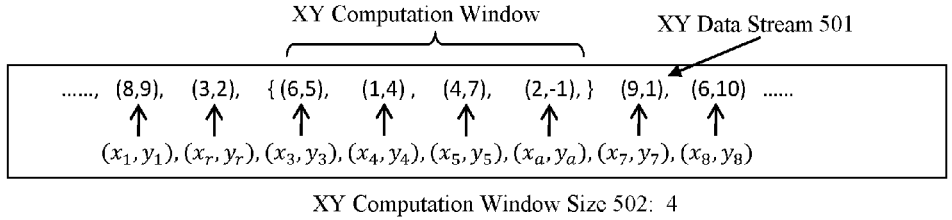

XY Computation Window Size 502: 4

Calculate Linear Regression Coefficients for *XY* Computation Window 505

Traditional Algorithm:

1. Use equation 405 and 406 to calculate the means of X variable and Y variable in XY computation window 505 respectively:

$$\bar{x}_3 = \frac{6+1+4+2}{4} = \frac{13}{4} = 3.25 \qquad \bar{y}_3 = \frac{5+4+7+(-1)}{4} = \frac{15}{4} = 3.75$$

Operations in this step: 2 divisions, 6 additions

2. Calculate $\sum_3^5 (x_i - \bar{x}_3)(y_i - \bar{y}_3) + (x_a - \bar{x}_3)(y_a - \bar{y}_3)$ $\sum_3^5 (x_i - \bar{x}_3)(y_i - \bar{y}_3) + (x_a - \bar{x}_3)(y_a - \bar{y}_3) = (6 - 3.25)(5 - 3.75) + (1 - 3.25)(4 - 3.75) + (4 - 3.25)(7 - 3.75) + (2 - 3.25)(-1 - 3.75) = 3.4375 - 0.5625 + 2.4375 + 5.9375 = 11.25$ Operations in this step: 4 multiplications, 3 additions, 8 subtractions 3. Calculate $\sum_3^5 (x_i - \bar{x}_3)^2 + (x_a - \bar{x}_3)^2$ $\sum_3^5 (x_i - \bar{x}_3)^2 + (x_a - \bar{x}_3)^2 = (6 - 3.25)^2 + (1 - 3.25)^2 + (4 - 3.25)^2 + (2 - 3.25)^2 = 14.75$ Operations in this step: 4 multiplications, 3 additions, 4 subtractions 4. Calculate $b1_3 = \frac{\sum_3^5 (x_i - \bar{x}_3)(y_i - \bar{y}_3) + (x_a - \bar{x}_3)(y_a - \bar{y}_3)}{\sum_3^5 (x_i - \bar{x}_3)^2 + (x_a - \bar{x}_3)^2}$ $b1_3 = \frac{\sum_3^5 (x_i - \bar{x}_3)(y_i - \bar{y}_3) + (x_a - \bar{x}_3)(y_a - \bar{y}_3)}{\sum_3^5 (x_i - \bar{x}_3)^2 + (x_a - \bar{x}_3)^2} = \frac{11.25}{14.75} = 0.7627118644067797$ Operations in this step: 1 division 7. Calculate $b0_3 = \bar{y}_3 - b1_3 \bar{x}_3$ for the 3$^{rd}$ iteration:

$b0_3 = \bar{y}_3 - b1_3 \bar{x}_3 = 3.75 - 0.7627118644067797 \times 3.25 = 3.75 - 2.4788135593220340225 = 1.2711864406779659775$ Operations in this step: 1 multiplication, 1 subtraction There are a total of 3 divisions, 9 multiplications, 12 additions and 13 subtractions.

For number of *n* pairs of data elements, traditional algorithms typically use 3 divisions, $2n+1$ multiplications, $4(n-1)$ additions and $3n+1$ subtractions when calculating simple linear regression coefficients for a computation window composed of *n* pairs of data elements without optimization.

Fig. 5A Cont'd 2

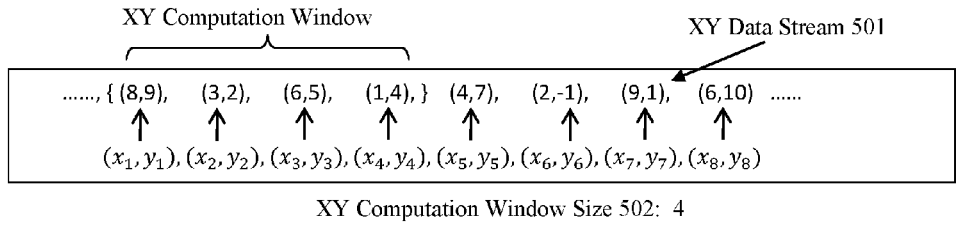

XY Computation Window Size 502: 4

Calculate Linear Regression Coefficients for XY Computation Window 503

Iterative Algorithm 1:

1. Use equations 405 and 406 to calculate the mean of X variable and Y variable in XY computation window 503 respectively:

$$\bar{x}_1 = \frac{8+3+6+1}{4} = \frac{18}{4} = 4.5 \qquad \bar{y}_1 = \frac{9+2+5+4}{4} = \frac{20}{4} = 5$$

Operations in this step: 2 divisions, 6 additions

2. Use equations 415 and 420 to calculate $XSS_1$ $$XSS_1 = \sum_1^4 x_i^2 = 8^2 + 3^2 + 6^2 + 1^2 = 110$$

Operations in this step: 4 multiplications, 3 additions

3. Calculate $\sum_1^4 (x_i - \bar{x}_1)(y_i - \bar{y}_1)$ $$\sum_1^4 (x_i - \bar{x}_1)(y_i - \bar{y}_1) = 14 + 4.5 + 0 + 3.5 = 22$$

Operations in this step: 4 multiplications, 3 additions, 8 subtractions

4. Calculate $\sum_1^4 (x_i - \bar{x}_1)^2$ $$\sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

5. Use equation 424 to calculate $SXY_1$ $$SXY_1 = \sum_1^4 x_i y_i = 8 \times 9 + 3 \times 2 + 6 \times 5 + 1 \times 4 = 72 + 6 + 30 + 4 = 112$$

Operations in this step: 4 multiplications, 3 additions

6. Use equation 407 to calculate $b1_1$ and equation 408 to calculate $b0_1$ for the 1st iteration:

$$b1_1 = \frac{\sum_1^4 (x_i - \bar{x}_1)(y_i - \bar{y}_1)}{\sum_1^4 (x_i - \bar{x}_1)^2} = \frac{22}{29} = 0.7586206896551724$$

$$b0_1 = \bar{y}_1 - b1_1 \bar{x}_1 = 5 - 0.7586206896551724 \times 4.5 = 1.5862068965517241$$

Operations in this step: 1 division, 1 multiplication, 1 subtraction

There are a total of 3 divisions, 17 multiplications, 18 additions and 13 subtractions.

Fig. 5B

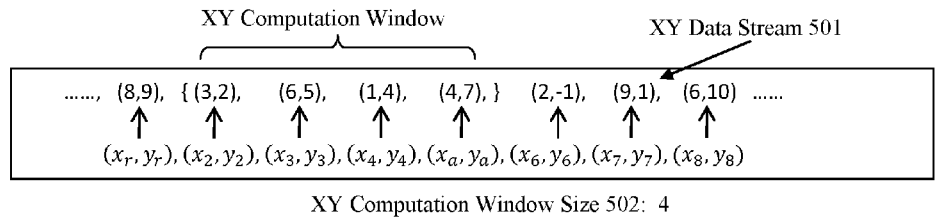

XY Computation Window Size 502: 4

Calculate Linear Regression Coefficients for XY Computation Window 504

Iterative Algorithm 1:

1. Use equations 417 and 418 to calculate $\bar{x}_2$ and $\bar{y}_2$ respectively $\bar{x}_2 = \bar{x}_1 + \frac{(x_a - x_r)}{4} = 4.5 + \frac{4-8}{4} = 3.5$ $\bar{y}_2 = \bar{y}_1 + \frac{(y_a - y_r)}{4} = 5 + \frac{(7-9)}{4} = 4.5$ Operations in this step: 2 divisions, 2 additions, 2 subtractions 2. Use equation 421 to calculate $XSS_2$ $XSS_2 = XSS_1 + x_a^2 - x_r^2 = 110 + 4^2 - 8^2 = 62$ Operations in this step: 2 multiplications, 1 addition, 1 subtraction 3. Use equation 423 to calculate $XV_2$ $XV_2 = XSS_2 - 4\bar{x}_2^2 = 62 - 4 \times 3.5^2 = 62 - 49 = 13$ Operations in this step: 2 multiplications, 1 subtraction 4. Use equation 426 to calculate $SXY_2$ $SXY_2 = SXY_1 + x_a y_a - x_r y_r = 112 + 4 \times 7 - 8 \times 9 = 112 + 28 - 72 = 68$ Operations in this step: 2 multiplications, 1 addition, 1 subtraction 5. Use equation 427 to calculate $b1_2$ and equation 428 to calculate $b0_2$ $b1_2 = \frac{SXY_2 - 4\bar{x}_2\bar{y}_2}{XV_2} = \frac{68 - 4 \times 3.5 \times 4.5}{13} = \frac{68 - 63}{13} = \frac{5}{13} = 0.38461538461538846$ $b0_2 = \bar{y}_2 - b1_2\bar{x}_2 = 4.5 - 0.3846153846153846 \times 3.5 = 3.1538461538461539$ Operations in this step: 1 division, 3 multiplications, 2 subtractions There are a total of 3 divisions, 9 multiplications, 4 additions and 7 subtractions.

Fig. 5B Cont'd 1

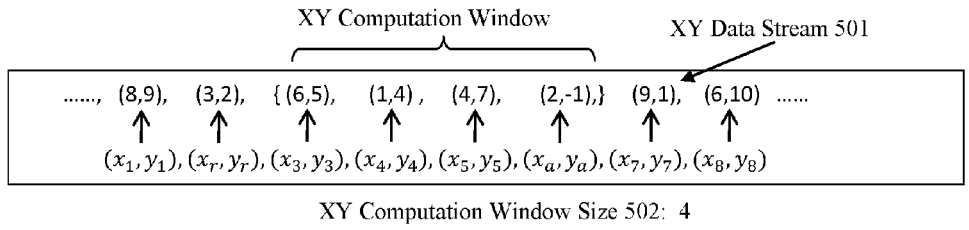

XY Computation Window Size 502: 4

Calculate Linear Regression Coefficients for XY Computation Window 505

Iterative Algorithm 1:

1. Use equations 417 and 418 to calculate $\bar{x}_3$ and $\bar{y}_3$ respectively $$\bar{x}_3 = \bar{x}_2 + \frac{(x_a - x_r)}{4} = 3.5 + \frac{(2-3)}{4} = 3.25$$

$$\bar{y}_3 = \bar{y}_2 + \frac{(y_a - y_r)}{4} = 4.5 + \frac{(-1-2)}{4} = 3.75$$

Operations in this step: 2 divisions, 2 additions, 2 subtractions

2. Use equations 421 to calculate $XSS_3$ $$XSS_3 = XSS_2 + x_a^2 - x_r^2 = 62 + 2^2 - 3^2 = 57$$

Operations in this step: 2 multiplications, 1 addition, 1 subtraction

3. Use equation 423 to calculate $XV_3$ $$XV_3 = XSS_3 - 4\bar{x}_3^2 = 57 - 4 \times 3.25^2 = 57 - 42.25 = 14.75$$

Operations in this step: 2 multiplications, 1 subtraction

4. Use equation 426 to iteratively calculate $SXY_3$ $$SXY_3 = SXY_2 + x_a y_a - x_r y_r = 68 + 2 \times (-1) - 3 \times 2 = 68 - 2 - 6 = 60$$

Operations in this step: 2 multiplications, 1 addition, 1 subtraction

5. Use equation 427 to calculate $b1_3$ and equation 428 to calculate $b0_3$ $$b1_3 = \frac{SXY_3 - 4\bar{x}_3\bar{y}_3}{XV_3} = \frac{60 - 4 \times 3.25 \times 3.75}{14.75} = \frac{60 - 48.75}{14.75} = \frac{11.25}{14.75} = 0.7627118644067797$$

$b0_3 = \bar{y}_3 - b1_3\bar{x}_3 = 3.75 - 0.7627118644067797 \times 3.25 = 3.75 - 2.478813559322034025 = 1.271186440677965975$ Operations in this step: 1 division, 3 multiplications, 2 subtractions There are a total of 3 divisions, 9 multiplications, 4 additions and 7 subtractions.

Fig. 5B Cont'd 2

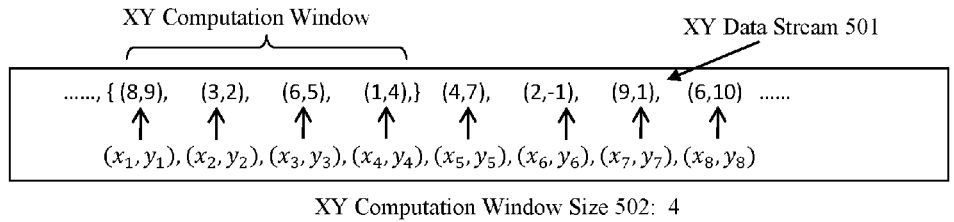

XY Computation Window Size 502: 4

Calculate Linear Regression Coefficients for XY Computation Window 503

Iterative Algorithm 2:

1. Use equations 405 and 406 to calculate the mean of X variable and Y variable in XY computation window 503 respectively:

$$\bar{x}_1 = \frac{8+3+6+1}{4} = \frac{18}{4} = 4.5$$

$$\bar{y}_1 = \frac{9+2+5+4}{4} = \frac{20}{4} = 5$$

Operations in this step: 2 divisions, 6 additions

2. Use equation 429 to calculate $SSDX_1$ for the 1st iteration:

$$SSDX_1 = \sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

3. Use equation 432 to calculate $SDXY_1$ for the 1st iteration:

$$SDXY_1 = \sum_1^4 (x_i - \bar{x}_1)(y_i - \bar{y}_1) = (8 - 4.5)(9 - 5) + (3 - 4.5)(2 - 5) + (6 - 4.5)(5 - 5) + (1 - 4.5)(4 - 5) = 14 + 4.5 + 0 + 3.5 = 22$$

Operations in this step: 4 multiplications, 3 additions, 8 subtractions

4. Use equation 435 to calculate $b1_1$ and equation 436 to calculate $b0_1$ for the 1st iteration:

$$b1_1 = \frac{SDXY_1}{SSDX_1} = \frac{22}{29} = 0.7586206896551724$$

$$b0_1 = \bar{y}_1 - b1_1 \bar{x}_1 = 5 - 0.7586206896551724 \times 4.5 = 1.5862068965517241$$

Operations in this step: 1 division, 1 multiplication, 1 subtraction

There are a total of 3 divisions, 9 multiplications, 12 additions and 13 subtractions.

Fig. 5C

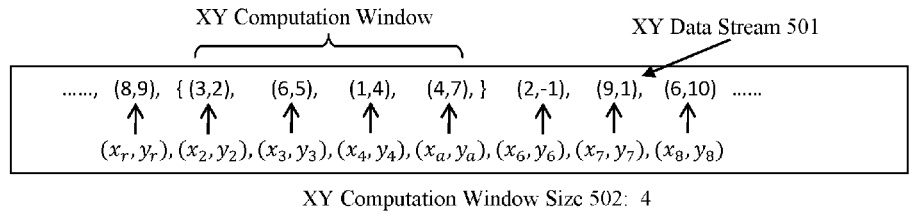

XY Computation Window Size 502: 4

Calculate Linear Regression Coefficients for XY Computation Window 504

Iterative Algorithm 2:

1. Use equations 417 and 418 to calculate $\bar{x}_2$ and $\bar{y}_2$ respectively $$\bar{x}_2 = \bar{x}_1 + \frac{(x_a - x_r)}{4} = 4.5 + \frac{(4-8)}{4} = 3.5$$

$$\bar{y}_2 = \bar{y}_1 + \frac{(y_a - y_r)}{4} = 5 + \frac{(7-9)}{4} = 4.5$$

Operations in this step: 2 division, 2 additions, 2 subtractions

2. Use equation 431 to iteratively calculate $SSDX_2$ $$SSDX_2 = SSDX_1 + (x_a - x_r)\big((x_r + x_a) - (\bar{x}_1 + \bar{x}_2)\big) = 29 + (4 - 8)\big((8 + 4) - (4.5 + 3.5)\big)$$
$$= 29 + (-4)(12 - 8) = 29 + (-4)(4) = 29 + (-16) = 13$$

Operations in this step: 1 multiplication, 3 additions, 2 subtractions

3. Use equation 434 to calculate $SDXY_2$ for the $2^{nd}$ iteration:

$$SDXY_2 = SDXY_1 + (y_a - \bar{y}_1)(x_a - x_r) + (y_a - y_r)(x_r - \bar{x}_2) = 22 + (7 - 5)(4 - 8) +$$
$$(7 - 9)(8 - 3.5) = 22 + (2)(-4) + (-2)(4.5) = 22 + (-8) + (-9) = 5$$

Operations in this step: 2 multiplications, 2 additions, 4 subtractions

4. Use equation 435 to calculate $b1_2$ and equation 436 to calculate $b0_2$ for the $2^{nd}$ iteration:

$$b1_2 = \frac{SDXY_2}{SSDX_2} = \frac{5}{13} = 0.3846153846153846$$

$$b0_2 = \bar{y}_2 - b1_2 \bar{x}_2 = 4.5 - 0.3846153846153846 \times 3.5 = 3.1538461538461539$$

Operations in this step: 1 division, 1 multiplication, 1 subtraction

There are a total of 3 divisions, 4 multiplications, 7 additions and 9 subtractions.

Fig. 5C Cont'd 1

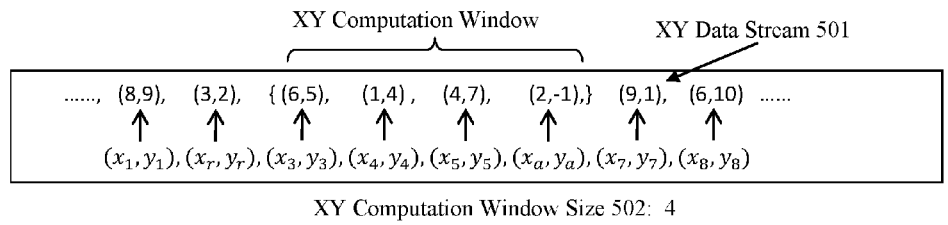

XY Computation Window Size 502: 4

Calculate Linear Regression Coefficients for XY Computation Window 505

Iterative Algorithm 2:

1. Use equations 417 and 418 to calculate $\bar{x}_3$ and $\bar{y}_3$ respectively for the 3$^{rd}$ iteration:

$\bar{x}_3 = \bar{x}_2 + \frac{(x_a - x_r)}{4} = 3.5 + \frac{(2-3)}{4} = 3.25$ $\bar{y}_3 = \bar{y}_2 + \frac{(y_a - y_r)}{4} = 4.5 + \frac{(-1-2)}{4} = 3.75$ Operations in this step: 2 divisions, 2 additions, 2 subtractions 2. Use equations 431 to calculate $SSDX_3$ for the 3$^{rd}$ iteration:

$SSDX_3 = SSDX_2 + (x_a - x_r)\big((x_r + x_a) - (\bar{x}_2 + \bar{x}_3)\big) = 13 + (2 - 3)\big((3 + 2) - (3.5 + 3.25)\big)$
$= 13 + (-1)(5 - 6.75) = 13 + (-1)(-1.75) = 13 + 1.75 = 14.75$ Operations in this step: 1 multiplication, 3 additions, 2 subtractions 3. Use equation 434 to calculate $SDXY_3$ for the 3$^{rd}$ iteration:

$SDXY_3 = SDXY_2 + (y_a - \bar{y}_2)(x_a - x_r) + (y_a - y_r)(x_r - \bar{x}_3)$
$= 5 + (-1 - 4.5)(2 - 3) + (-1 - 2)(3 - 3.25) = 11.25$ Operations in this step: 2 multiplications, 2 additions, 4 subtractions 4. Use equation 435 to calculate $b1_3$ and equation 436 to calculate $b0_3$ for the 3$^{rd}$ iteration:

$b1_3 = \frac{SDXY_3}{SSDX_3} = \frac{11.25}{14.75} = 0.7627118644067797$ $b0_3 = \bar{y}_3 - b1_3 \bar{x}_3 = 3.75 - 0.7627118644067797 \times 3.25 = 3.75 - 2.478813559322034025 = 1.271186440677965975$ Operations in this step: 1 division, 1 multiplication, 1 subtraction There are a total of 3 divisions, 4 multiplications, 7 additions and 9 subtractions.

Fig. 5C Cont'd 2

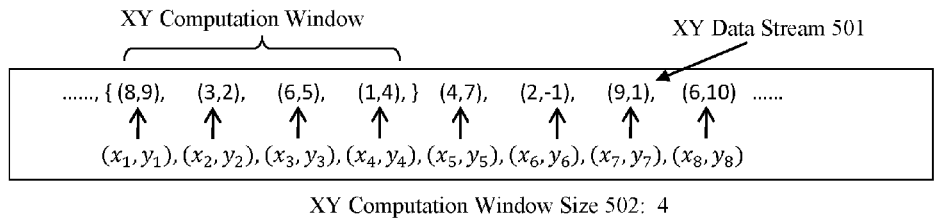

XY Computation Window Size 502: 4

Calculate Linear Regression Coefficients for XY Computation Window 503

Iterative Algorithm 3:

1. Use equations 405 and 406 to calculate the mean of X variable and Y variable in XY computation window 503 respectively:

$$\bar{x}_1 = \frac{8+3+6+1}{4} = \frac{18}{4} = 4.5$$

$$\bar{y}_1 = \frac{9+2+5+4}{4} = \frac{20}{4} = 5$$

Operations in this step: 2 divisions, 6 additions

2. Use equation 437 to calculate $XSS_1$ $$XSS_1 = \sum_1^4 x_i^2 = 8^2 + 3^2 + 6^2 + 1^2 = 64 + 9 + 36 + 1 = 110$$

Operations in this step: 4 multiplications, 3 additions

3. Use equation 440 to calculate $SXY_1$ $$SXY_1 = \sum_1^4 x_i y_i = 8 \times 9 + 3 \times 2 + 6 \times 5 + 1 \times 4 = 72 + 6 + 30 + 4 = 112$$

Operations in this step: 4 multiplications, 3 additions

4. Use equation 443 to calculate $b1_1$ and equation 444 to calculate $b0_1$ for the 1st iteration:

$$b1_1 = \frac{SXY_1 - 4\bar{x}_1\bar{y}_1}{XSS_1 - 4\bar{x}_1^2} = \frac{112 - 4 \times 4.5 \times 5}{110 - 4 \times 4.5^2} = \frac{112-90}{110-81} = \frac{22}{29} = 0.7586206896551724$$

$$b0_1 = \bar{y}_1 - b1_1\bar{x}_1 = 5 - 0.7586206896551724 \times 4.5 = 1.5862068965517241$$

Operations in this step: 1 division, 4 multiplications, 3 subtractions

There are a total of 3 divisions, 12 multiplications, 12 additions and 3 subtractions.

Fig. 5D

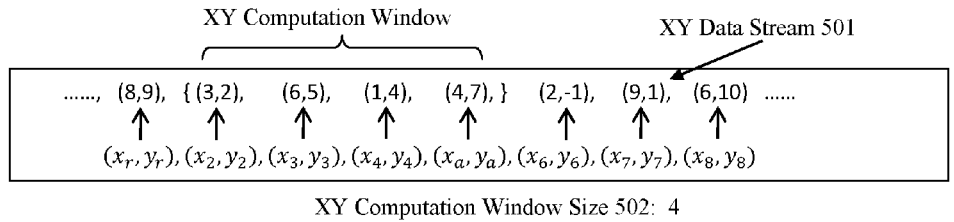

XY Computation Window Size 502: 4

<u>Calculate Linear Regression Coefficients for XY Computation Window 504</u>

Iterative Algorithm 3:

1. Use equations 417 and 418 to calculate $\bar{x}_2$ and $\bar{y}_2$ respectively $$\bar{x}_2 = \bar{x}_1 + \frac{(x_a - x_r)}{4} = 4.5 + \frac{4-8}{4} = 3.5$$

$$\bar{y}_2 = \bar{y}_1 + \frac{(y_a - y_r)}{4} = 5 + \frac{(7-9)}{4} = 4.5$$

Operations in this step: 2 divisions, 2 additions, 2 subtractions

2. Use equation 439 to iteratively calculate $XSS_2$ $$XSS_2 = XSS_1 + x_a^2 - x_r^2 = 110 + 4^2 - 8^2 = 110 + 16 - 64 = 62$$

Operations in this step: 2 multiplications, 1 addition, 1 subtraction

3. Use equation 442 to calculate $SXY_2$ $$SXY_2 = SXY_1 + x_a y_a - x_r y_r = 112 + 4 \times 7 - 8 \times 9 = 112 + 28 - 72 = 68$$

Operations in this step: 2 multiplications, 1 addition, 1 subtraction

4. Use equation 443 to calculate $b1_2$ and equation 444 to calculate $b0_2$ for the 2$^{nd}$ iteration:

$$b1_2 = \frac{SXY_2 - 4\bar{x}_2\bar{y}_2}{XSS_2 - 4\bar{x}_2^2} = \frac{68 - 4 \times 3.5 \times 4.5}{62 - 4 \times 3.5^2} = \frac{68 - 63}{62 - 49} = \frac{5}{13} = 0.3846153846153846$$

$$b0_2 = \bar{y}_2 - b1_2\bar{x}_2 = 4.5 - 0.3846153846153846 \times 3.5 = 3.1538461538461539$$

Operations in this step: 1 division, 4 multiplications, 3 subtractions

There are a total of 3 divisions, 8 multiplications, 4 additions and 7 subtractions.

Fig. 5D Cont'd 1

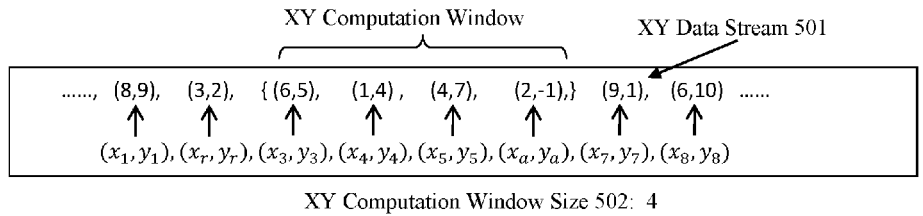

XY Computation Window Size 502: 4

Calculate Linear Regression Coefficients for XY Computation Window 505

Iterative Algorithm 3:

1. Use equation 417 to calculate $\bar{x}_3$ and equation 418 to calculate $\bar{y}_3$ respectively $$\bar{x}_3 = \bar{x}_2 + \frac{(x_a - x_r)}{4} = 3.5 + \frac{(2-3)}{4} = 3.25$$

$$\bar{y}_3 = \bar{y}_2 + \frac{(y_a - y_r)}{4} = 4.5 + \frac{(-1-2)}{4} = 3.75$$

Operations in this step: 2 divisions, 2 additions, 2 subtractions

2. Use equation 439 to calculate $XSS_3$ $$XSS_3 = XSS_2 + x_a^2 - x_r^2 = 62 + 2^2 - 3^2 = 62 + 4 - 9 = 57$$

Operations in this step: 2 multiplications, 1 addition, 1 subtraction

3. Use equation 442 to calculate $SXY_3$ $$SXY_3 = SXY_2 + x_a y_a - x_r y_r = 68 + 2 \times (-1) - 3 \times 2 = 68 - 2 - 6 = 60$$

Operations in this step: 2 multiplications, 1 addition, 1 subtraction

4. Use equation 443 to calculate $b1_3$ and equation 444 to calculate $b0_3$ for the 3$^{rd}$ iteration:

$$b1_3 = \frac{SXY_3 - 4\bar{x}_3\bar{y}_3}{XSS_3 - 4\bar{x}_3^2} = \frac{60 - 4 \times 3.25 \times 3.75}{57 - 4 \times 3.25^2} = \frac{60 - 48.75}{57 - 42.25} = \frac{11.25}{14.75} = 0.7627118644067797$$

$$b0_3 = \bar{y}_3 - b1_3\bar{x}_3 = 3.75 - 0.7627118644067797 \times 3.25 = 3.75 - 2.478813559322034025 = 1.271186440677965975$$

Operations in this step: 1 division, 4 multiplications, 3 subtractions

There are a total of 3 divisions, 8 multiplications, 4 additions and 7 subtractions.

Fig. 5D Cont'd 2

|  | Division | Multiplication | Addition | Subtraction |
|---|---|---|---|---|
| Traditional Algorithm | 3 | 9 | 12 | 13 |
| Iterative Algorithm 1 | 3 | 9 | 4 | 7 |
| Iterative Algorithm 2 | 3 | 4 | 7 | 9 |
| Iterative Algorithm 3 | 3 | 8 | 4 | 7 |

|  | Division | Multiplication | Addition | Subtraction |
|---|---|---|---|---|
| Traditional Algorithm | 3 | 2,000,001 | 3,999,996 | 3,000,001 |
| Iterative Algorithm 1 | 3 | 9 | 4 | 7 |
| Iterative Algorithm 2 | 3 | 4 | 7 | 9 |
| Iterative Algorithm 3 | 3 | 8 | 4 | 7 |

ITERATIVE SIMPLE LINEAR REGRESSION COEFFICIENT CALCULATION FOR STREAMED DATA USING COMPONENTS

CROSS-REFERENCE TO RELATED APPLICATIONS

This application claims the benefit of provisional patent application Ser. No. 62/126,445, filed 2015 Feb. 28 by the present inventor.

BACKGROUND AND RELEVANT ART

Internet, mobile communications, navigation, online gaming, sensing technologies and large scale computing infrastructures have produced large amounts of data sets every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Big Data sets are accumulated over time and they may be considered as a data stream with irregular time intervals. Streamed data may also be data continuously read from storage devices, e.g., storage devices on multi-computing devices which store a Big Data set.

Stream processing has become a focused research area recently due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require stream processing due to their nature, e.g., audio, video and digital TV, etc.

Processing streamed data may include performing calculations on multiple data elements. Thus, to process streamed data, a system comprising one or more computing devices typically includes a buffer on one or more storage media for storing some number of streamed data elements received by the system. Processing the streamed data elements may include accessing data elements stored in the buffer. When performing statistical calculations on streamed data elements, buffer requirements may be quite large. For example, when calculating simple linear regression coefficients a (potentially large) number of data elements may need to be accessed.

Further, some statistical calculations are recalculated as new streamed data elements are received. Thus, the (potentially large) number of data elements may be repeatedly accessed. For example, it may be that simple linear regression coefficients are calculated for a computation window and the computation window includes the last n pairs of data elements. As such, every time a new pair of data elements (one data element from an independent variable and the other from a dependent variable) is accessed or received, the new pair of new elements is added to the computation window and the current $n^{th}$ pair of data elements is moved out of the computation window respectively. All 2n data elements in the computation window are then accessed to re-estimate simple linear regression coefficients.

As such, each pair of data elements remains in the computation window for n simple linear regression coefficient calculations before it is aged out of the computation window. Accordingly, each pair of data elements is read from the buffer and used n times. Performing statistical calculations on streamed data elements this way is time consuming and is an inefficient use of resources. When performing simple linear regression coefficient calculation for a computation window all 2n data elements in the computation window will be visited and used, therefore performing statistical calculations on streamed data elements in this way is time consuming and inefficient.

Depending on necessity, the computation window size n may be extremely large, so the data elements in a computation window may be distributed over a cloud comprising hundreds of thousands of computing devices. Re-calculating simple linear regression coefficients in traditional ways on streamed data results in slow response and significant waste of computing resources.

BRIEF SUMMARY

The present disclosure describes methods, systems, and computing device program products for iteratively calculating simple linear regression coefficients for streamed data. A system comprising one or more computing devices includes one or two buffers on one or more storage media for storing streamed data elements. A computation window size indicates a specified number of data elements for filling a computation window for the one or two buffers. The computation window, a subset of all data elements received from a data stream, contains the data elements involved in a simple linear regression coefficient calculation. Iteratively calculating simple linear regression coefficients for an adjusted computation window includes iteratively calculating one or more (p (p≥1)) components of simple linear regression coefficients for the adjusted computation window based on one or more components of simple linear regression coefficients for a previous computation window and then calculating simple linear regression coefficients using one or more iteratively calculated components. Iteratively calculating simple linear regression coefficients avoids visiting all data elements in the adjusted computation window and performing redundant computations thereby increasing calculation efficiency, saving computing resources and reducing computing system's power consumption.

The computing system initializes a computation window size n (n>1) and one or more v (1≤v≤p) components of simple linear regression coefficients for the computation window of either one or two buffers. The initialization of the computation window size comprises counting the number of pairs of data elements contained in the computation window or accessing or receiving a predefined computation window size. The initialization of the one or more components comprises calculating the one or more components through their definitions based on the data elements in the computation window or accessing or receiving pre-calculated one or more components from one or more computing-device-readable media.

The computing system receives a pair of data elements to be added to the computation window. Said pair of data elements contains an observation of an independent variable and an observation of a dependent variable. The computing system stores the received pair of data elements in the one or two buffers. The computing system adjusts the computation window by removing the least recently received pair of data elements from the computation window and adding the to-be-added pair of data elements to the computation window.

The computing system iteratively calculates one or more components of simple linear regression coefficients for the adjusted computation window based on the one or more components for the previous computation window.

The iterative calculation of the one or more components of the simple linear regression coefficients for the adjusted computation window includes directly iteratively calculates v ($1 \leq v \leq p$) components. Directly iteratively calculating the v components includes accessing the removed pair of data elements, the added pair of data elements and the v components. Directly iteratively calculating the v components includes calculating each of the v components one by one. Directly iteratively calculating each of the v components includes removing any contribution of the removed pair of data elements from each of the v components mathematically. Directly iteratively calculating each of the v components includes adding a contribution of the added pair of data elements to each of the v components mathematically.

The iterative calculation of the one or more components of the simple linear regression coefficients for the adjusted computation window includes indirectly iteratively calculates $w=p-v$ components as needed, i.e., the w components may be calculated when simple linear regression coefficients are accessed. Indirectly iteratively calculating the w components includes indirectly iteratively calculating each of the w components one by one. Indirectly iteratively calculating a component includes accessing and using one or more components other than said component itself.

The computing system performs simple linear regression coefficient calculation as needed using one or more initialized or iteratively calculated components.

The computing system may keep receiving a pair of data elements to be added to the computation window, storing the received pair of data elements into one or two data buffers, adjusting the computation window, iteratively calculating one or more components and performing simple linear regression coefficient calculation as needed based on the one or more iteratively calculated components, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of simple linear regression coefficients and traditional equations for calculating simple linear regression coefficients on a computation window.

FIG. 4B illustrates some components of simple linear regression coefficients, which may be used for calculating simple linear regression coefficients on a computation window.

FIG. 4C illustrates the first example iterative simple linear regression coefficient calculation algorithm (iterative algorithm 1) and its equations for iteratively calculating simple linear regression coefficients based on iteratively calculated components $XS_{k+1}$ or $\bar{x}_{k+1}$ and $YS_{k+1}$ or $\bar{y}_{k+1}$, $XV_{k+1}$, and $SXY_{k+1}$.

FIG. 4D illustrates the second example iterative simple linear regression coefficient calculation algorithm (iterative algorithm 2) and its equations for iteratively calculating simple linear regression coefficients based on iteratively calculated components $XS_k$ or $\bar{x}_k$, $YS_k$ or $\bar{y}_k$, $XS_{k+1}$ or $\bar{x}_{k+1}$ and $YS_{k+1}$ or $\bar{y}_{k+1}$, $SSDX_{k+1}$, and $SDXY_{k+1}$.

FIG. 4E illustrates the third example iterative simple linear regression coefficient calculation algorithm (iterative algorithm 3) and its equations for iteratively calculating simple linear regression coefficients based on iteratively calculated components $XS_{k+1}$ or $\bar{x}_{k+1}$ and $YS_{k+1}$ or $\bar{y}_{k+1}$, $XSS_{k+1}$ and $SXY_{k+1}$.

FIG. 5A illustrates an example of calculating simple linear regression coefficients using traditional algorithms as shown in FIG. 4A.

FIG. 5B illustrates an example of calculating simple linear regression coefficients using iterative algorithm 1 as shown in FIG. 4C.

FIG. 5C illustrates an example of calculating simple linear regression coefficients using iterative algorithm 2 as shown in FIG. 4D.

FIG. 5D illustrates an example of calculating simple linear regression coefficients using iterative algorithm 3 as shown in FIG. 4E.

FIG. 6 illustrates computational loads for traditional algorithms and iterative algorithms with a computation window of size 4.

FIG. 7 illustrates computational loads for traditional algorithms and iterative algorithms with a computation window of size 1,000,000.

DETAILED DESCRIPTION

Figure 1:
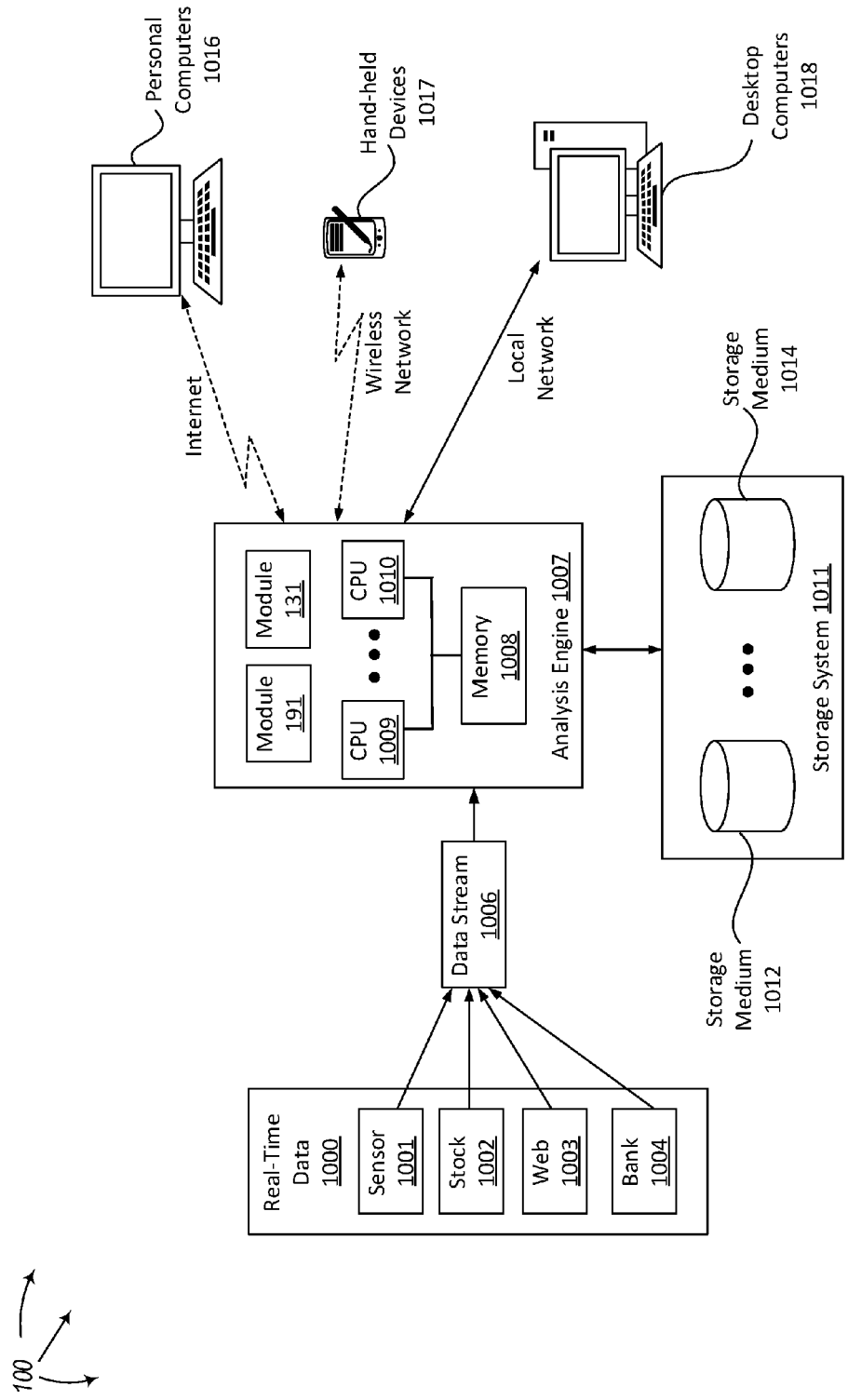
FIG. 1 illustrates a high-level overview of an example computing system that facilitates iteratively calculating simple linear regression coefficients for streamed data.

The present disclosure describes methods, systems, and computing device program products for iteratively calculating simple linear regression coefficients for streamed data. A computing system comprising one or more computing devices includes one or two buffers on one or more storage media for storing streamed data elements. The one or two buffers may reside in memory or other non-transitory computer-readable media, such as a hard disk or other media, and may include multiple distributed files on multiple distributed computing devices, such as may be connected end-to-end to form one or two "circular buffers". A computation window size indicates a specified number of data elements for filling a computation window for the one or two buffers. The computation window, a subset of all data elements received from one or two data streams, contains the data elements involved in simple linear regression coefficient calculation. Iteratively calculating simple linear regression coefficients for an adjusted computation window includes by iteratively calculating one or more (p (p≥1)) components of simple linear regression coefficients for the adjusted computation window based on one or more components of simple linear regression coefficients for a pre-adjusted computation window and then calculating simple linear regression coefficients using one or more iteratively calculated components. Iteratively calculating simple linear regression coefficients avoids visiting all data elements in an adjusted computation window and performing redundant computations thereby increasing calculation efficiency, saving computing resources and reducing computing system's power consumption.

Linear regression is an approach for modeling the relationship between a scalar dependent variable Y and one or more explanatory or independent variables denoted X. The case of one explanatory or independent variable is called simple linear regression. Simple linear regression has many practical uses. Most applications fall into one of the following two broad categories:

If the goal is prediction, forecasting, or reduction, simple linear regression may be used to fit a predictive model to an observed data set of Y and X values. After developing such a model, if an additional value of X is then given without its accompanying value of Y, the fitted model may be used to make a prediction of the value of Y.

Given a variable Y and a variable X that may be related to Y, simple linear regression analysis may be applied to quantify the strength of the relationship between Y and X.

A statistical model is a description of a state or process. Simple linear regression is for modeling the linear relationship between two variables. A simple linear regression model is often written as the following form $$Y=\beta 0+\beta 1 X+\epsilon$$

Where Y is the dependent variable, β0 is the Y intercept, β1 is the gradient or the slope of the regression line, X is the independent variable, and ε is the error. It is usually assumed that error ε is normally distributed with E(ε)=0 and a constant variance Var(ε)=σ² in the simple linear regression. Linear regression calculation involves estimating β1 and β0 based on observed values from X and Y. The least squares principle for the simple linear regression model is to find estimates b1 and b0 such that the sum of the squared distance from actual response $y_i$ and predicted response $\hat{y}_i=\beta 0+\beta 1 x_i$ reaches the minimum among all possible choices of regression coefficients β0 and β1. The relationship between Y and X may be described by a fitted regression line $\hat{Y}=b0+b1X$. The estimates b1 and b0 may be calculated using following equations:

$$b1 = \frac{\sum_{1}^{n}(x_i - \bar{x}_k)(y_i - \bar{y}_k)}{\sum_{1}^{n}(x_i - \bar{x}_k)^2}$$

$$b0 = \bar{y}_k - b1\bar{x}_k$$

The estimates b1 and b0 are called simple linear regression coefficients. Once b1 is calculated, b0 may be calculated.

Simple linear regression calculation works on two variables, however data elements involved in simple linear regression coefficient calculation should be calculated in pairs (i.e., the coordinates of a point in a 2-D space), thus the data elements from two variables are grouped into pairs and put into a single computation window. The computation window may be either input and stored separately or input and stored in a combined interleaved manner. For the former case, there will be two input streams and each input stream contains the data elements of one variable respectively, and there will be two buffers and each buffer stores the data elements of one variable respectively. For the latter case, there will be a single input stream and the input stream contains multiple data pairs with each data pair containing one data element from each variable.

As used herein, a component is a quantity or expression appearing in simple linear regression's coefficients definition equations or any transforms of the definition equations. A simple linear regression coefficient is the largest component of a simple linear regression coefficient itself. Simple linear regression coefficients may be calculated using one or more components. Some example components of simple linear regression coefficients may be found in FIG. 4B.

A component may be either directly iteratively calculated or indirectly iteratively calculated. The difference is that when directly iteratively calculating a component, the component is calculated based on the component's value in previous iteration but when indirectly iteratively calculating a component, the component is calculated based on components other than the component itself.

For a given component, it might be directly iteratively calculated in one algorithm but indirectly iteratively calculated in another algorithm.

For a given algorithm, assume the total number of different components is p (p≥1), the number of directly calculated components is v (1≤v≤p), then the number of indirectly iteratively calculated components is w=p−v (0≤w<p). For any algorithm, there will be at least one component being directly iteratively calculated. It is possible that all components are directly iteratively calculated (in this case v=p and w=0). However, directly iteratively calculated components must be calculated in every iteration no matter if simple linear regression coefficients are accessed or not in a specific iteration.

For a given algorithm, if a component is directly iteratively calculated, then the component must be calculated in every iteration (i.e., whenever a pair of data elements is removed from and a pair of data elements is added to the computation window). However, if a component is indirectly iteratively calculated, then the component only need to be calculated as needed (i.e., when simple linear regression coefficients need to be calculated and accessed). Thus, when simple linear regression coefficients are not accessed in a specific iteration and some components are indirectly iteratively calculated, only a small number of components need to be iteratively calculated. Understanding that an indirectly iteratively calculated component may also be used in the calculation of a directly iteratively calculated component. In that case, the indirectly iteratively calculated component should also be calculated in every iteration.

Simple linear regression coefficients may be calculated on a need basis. When simple linear regression coefficients are not accessed for every data change in the computation window, the one or more computing devices may just iteratively calculate one or more components for each data change only. Iteratively calculating the one or more components avoids visiting all previous input and performing redundant computations thereby increasing calculation efficiency. Simple linear regression coefficients may be calculated based on the one or more components and returned whenever it is accessed. Depending on the need, the computing device may calculate simple linear regression coefficients for the computation window based on the one or more components.

Within this description and the following claims, a "circular buffer" is a data structure that uses a single, fixed-size "buffer" as if it were connected end-to-end. A circular buffer may also be referred to as a cyclic buffer or a ring buffer. The "buffer" may be a commonly used circular buffer which is generally a space allocated in a local memory. The "buffer" may also be a "virtual circular buffer" which does not necessarily need to be in memory and may be a file on a hard disk or even multiple distributed files on multiple distributed computing devices as long as those distributed files logically connected end-to-end to form a "circular buffer".

In general, input data are added to either a buffer of size 2n or two buffers each of size n. There are two options to deal with the case when the one or two buffers are not filled up. One option is that do not perform simple linear regression coefficient calculation until the one or two buffers are filled up, and once the one or two buffers are filled, one or more components are calculated for the first 2n data elements. The other option is that when needed simple linear regression coefficients may be incrementally calculated from the very beginning based on "Incremental Simple Linear Regression Coefficient Calculation on Big Data or Streamed Data Using Components", a separate patent application by Jizhu Lu, until the one or two buffers are filled up. Once the one or two buffer(s) are filled up, an iterative algorithm may be used for iteratively performing simple linear regression coefficient calculation. As pairs of data elements are received, one or more components are calculated by either using the prior components or using other components. Simple linear regression coefficients may be calculated based on the iteratively calculated one or more components.

The computing device accesses input data elements for a computation window of the one or two buffers. When using two buffers, each buffer comprises the data elements of one variable for the computation window respectively. When using one buffer, the buffer comprises interleaved data elements from two variables for the computation window. For streamed data processing, removing a (pair of) data element(s) or adding a (pair of) data element(s) generally happens at either end of the buffer.

Within this description and the following claims, a least recent pair of data elements in a computation window or a computation window means the $n^{th}$ closest pair of data elements in time to the most recently received pair of data elements in the computation window or the computation window.

Embodiments of the invention include iteratively calculating one or more (p (p≥1)) components of simple linear regression coefficients in an adjusted computation window based on one or more (p (p≥1)) components calculated for the previous computation window.

The computing system initializes a computation window size n (n>1) and one or more components of simple linear regression coefficients for the computation window of either one or two buffers using the data elements in the computation window stored in the one or two buffers.

The computing system receives a pair of data elements to be added to the computation window. Said pair of data elements contains an observation of an independent variable and an observation of a dependent variable. The computing system stores the received pair of data elements in the one or two buffers. The computing system adjusts the computation window by: removing a least recently received pair of data elements from the computation window and adding the to-be-added pair of data elements to the computation window.

The computing system iteratively calculates one or more components of simple linear regression coefficients for the adjusted computation window based on the one or more components for the previous computation window.

The iterative calculation of the one or more components of the linear regression coefficients for the adjusted computation window includes directly iteratively calculating v (1≤v≤p) components. Directly iteratively calculating v components includes accessing the removed pair of data elements, the added pair of data elements and the v components. Directly iteratively calculating the v components includes directly iteratively calculating each of the v components one by one. Directly iteratively calculating a component includes removing any contribution of the removed pair of data elements from the component mathematically. Directly iteratively calculating a component includes adding a contribution of the added pair of data elements to the component mathematically. For example, iteratively calculating v components includes directly iteratively calculating a sum or a mean for all data elements in the computation window from each of two variables respectively. Directly iteratively calculating the sum or the mean includes accessing the removed pair of data elements, the added pair of data elements and the sum or the mean. Directly iteratively calculating the sum or the mean includes removing any contribution of the removed pair of data elements from the sum or the mean mathematically. Directly iteratively calculating the sum or the mean includes adding a contribution of the added pair of data elements to the sum or the mean mathematically.

The iterative calculation of the one or more components of the linear regression coefficients includes indirectly iteratively calculating w=p−v components as needed. Indirectly iteratively calculating the w components includes indirectly iteratively calculating each of the w components one by one. Indirectly iteratively calculating a component includes accessing and using one or more components other than the component itself (Depending on the specific algorithm used, calculating each of the w components may also need access to and use of the pair of data elements added to the computation window). The one or more components may have been initialized, directly iteratively calculated or indirectly iteratively calculated.

The computing system performs simple linear regression coefficient calculation as needed based on one or more initialized or iteratively calculated components.

The computing system may keep receiving a pair of data elements to be added to the computation window, storing the received pair of data elements into one or two data buffers, adjusting the computation window, iteratively calculating one or more components and calculating simple linear regression coefficients as needed based on the one or more iteratively calculated components, and the computing system may repeat this process for as many times as needed.

Embodiments of the present invention may comprise or utilize a special purpose or general-purpose computing device including computing device hardware, such as, for example, one or more processors and system memory, as discussed in details below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device or special purpose computing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

FIG. 1 illustrates a high-level overview of an example computing system 100 that facilitates iteratively calculating simple linear regression coefficients for streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, simple linear regression coefficient calculation module 191 and component calculation modules 131. Simple linear regression coefficient calculation module 191 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Understanding that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
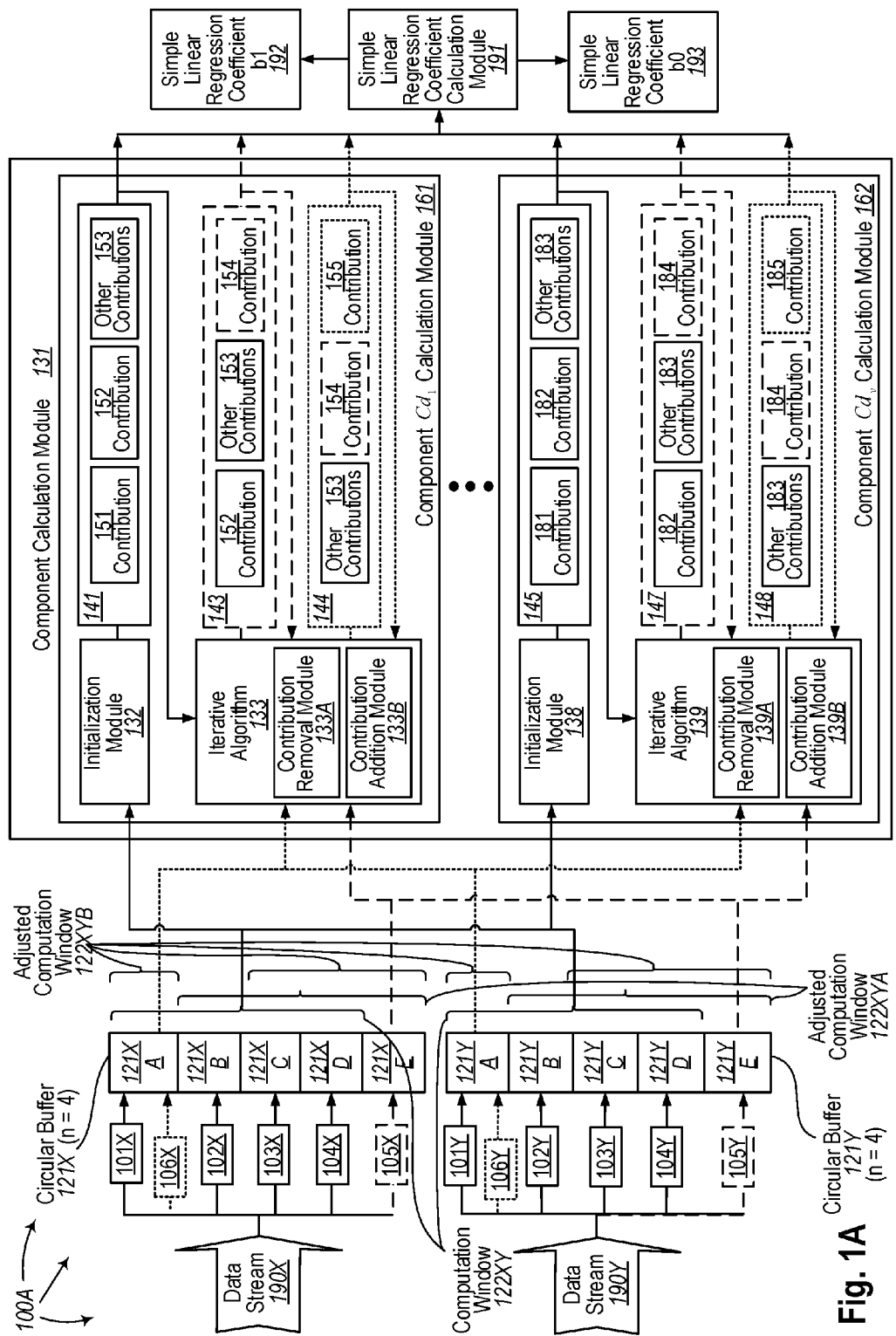
FIG. 1A illustrates an example computing device architecture that facilitates iteratively calculating simple linear regression coefficients for streamed data with two inputs with all components being directly iteratively calculated.

FIG. 1A illustrates an example computing device architecture 100A that facilitates iteratively calculating simple linear regression coefficients for streamed data with all (v=p≥1) components being directly iteratively calculated. FIG. 1A illustrates 1007 and 1006 shown in FIG. 1. Referring to FIG. 1A, computing device architecture 100A includes iterative component calculation module 131, simple linear regression coefficient calculation module 191 and simple linear regression coefficients b1 192 and b0 193. Iterative component calculation module 131 may be connected to (or is part of) a network, such as, for example, a Local Area Network ("LAN"), a Wide Area Network ("WAN"), and even the Internet. Accordingly, iterative component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 may be used as the input of simple linear regression coefficients calculation module 191, and simple linear regression coefficients calculation module 191 may generate simple linear regression coefficients b1 192 and b0 193.

In general, data stream 190X and data stream 190Y may be a sequence of digitally encoded signals (e.g., packets of data or data packets) respectively used to transmit or receive information that is in the process of being transmitted. Data stream 190X and data stream 190Y may stream data elements, such as, for example, stock quotes, audio data, video data, geospatial data, web data, mobile communication data, online gaming data, banking transaction data, sensor data, closed-captioning data, etc., to computing device architecture 100A. Data stream 190X and data stream 190Y may stream stored data or be a live stream respectively.

As pairs of data elements are received, the data elements may be placed in a location within circular buffer 121X and circular buffer 121Y respectively. A pair of data elements (101X, 101Y) may be received prior to pairs of data elements (102X, 102Y), (103X, 103Y), and (104X, 104Y). For example, data element 101X may be placed in location 121XA, data element 101Y may be placed in location 121YA, data element 102X may be placed in location 121XB, data element 102Y may be placed in location 121YB, data element 103X may be placed in location 121XC, data element 103Y may be placed in location 121YC, data element 104X may be placed in location 121XD, data element 104Y may be placed in location 121YD, data element 105X may be placed in location 121XE, and data element 105Y may be placed in location 121YE.

Subsequently, data element 106X and data element 106Y may be received. Data element 106X may be placed in location 121XA (overwriting data element 101X). Data element 106Y may be placed in location 121YA (overwriting data element 101Y).

As depicted, circular buffer 121X has five locations, 121XA-121XE, and circular buffer 121Y has five locations, 121YA-121YE and the two buffers have a computation window 122XY of four pairs (i.e., n=4). Data elements within computation window 122XY may rotate as received pair of data elements are placed within circular buffer 121X and 121Y respectively. For example, when data element 105X is placed in location 121XE and data element 105Y is placed in location 121YE, computation window 122XY transitions to adjusted computation window 122XYA. When data element 106X is subsequently placed in location 121XA and data element 106Y is subsequently placed in location 121YA, adjusted computation window 122XYA transitions to adjusted computation window 122XYB.

Referring to computing device architecture 100A, iterative component calculation module 131 comprises one or more (v (v=p≥1)) component calculation modules for directly iteratively calculating v components for data elements in a computation window. Number v varies depending on which iterative algorithm is used. Each component calculation module comprises an initialization module for initializing a component on the initial computation window and an algorithm for directly iteratively calculating the component on adjusted computation window afterwards. For example, calculation module 161 comprises initialization module 132 and iterative algorithm 133, and calculation module 162 comprises initialization module 138 and iterative algorithm 139.

Initialization module 132 is configured to calculate component $Cd_1$ for data elements in the computation window and component calculation initialization module 138 is configured to calculate component $Cd_v$ for data elements in the computation window. Initialization module 132 and initialization module 138 access or receive full sets of data elements (i.e., 4 pairs of data elements) from the computation window as input. Initialization module 132 calculates component $Cd_1$ and initialization module 138 calculates component $Cd_v$ from the full sets of data elements from the computation window. Thus, each data element contributes to all v components ranging from component $Cd_1$ to component $Cd_v$. Initialization module 132 may be used for an initial component $Cd_1$ calculation or when component $Cd_1$ calculations are reset. Similarly, initialization module 138 may be used for an initial component $Cd_v$ calculation or when component $Cd_v$ calculations are reset.

Iterative algorithm 133 accesses or receives a prior component $Cd_1$ value, a removed pair of data elements and an added pair of data elements as input. Iterative algorithm 133 directly iteratively calculates a component $Cd_1$ for the adjusted computation window based on the prior component $Cd_1$ value, the removed pair of data elements in the computation window and the added pair of data elements. Contribution removal module 133A may remove any contribution of the removed pair of data elements from the prior component $Cd_1$. Contribution addition module 133B may add a contribution of the added pair of data elements to the prior component $Cd_1$. Removing a contribution of the removed pair of data elements along with adding a contribution of the added pair of data elements may be used for calculating component $Cd_1$ for the computation window. Iterative algorithm 139 works in a similar way as iterative algorithm 133. Iterative algorithm 139 accesses or receives a prior component $Cd_v$ value, a removed pair of data elements and an added pair of data elements from computation window as input. Iterative algorithm 139 calculates a component $Cd_v$ for the adjusted computation window based on the prior component $Cd_v$ value, the removed pair of data elements and the added pair of data elements. Contribution removal module 139A may remove a contribution of the removed pair of data elements from the prior component $Cd_v$. Contribution addition module 139B may add a contribution of the added pair of data elements to the prior component $Cd_v$. Removing any contribution of the removed pair of data elements along with adding a contribution of the added pair of data elements may be used for calculating component $Cd_v$ for the computation window.

Calculation module 191 is configured to calculate simple linear regression coefficients b1 192 and b0 193 on data elements in the computation window based on one or more initialized or iteratively calculated components as input.

Figure 1B:
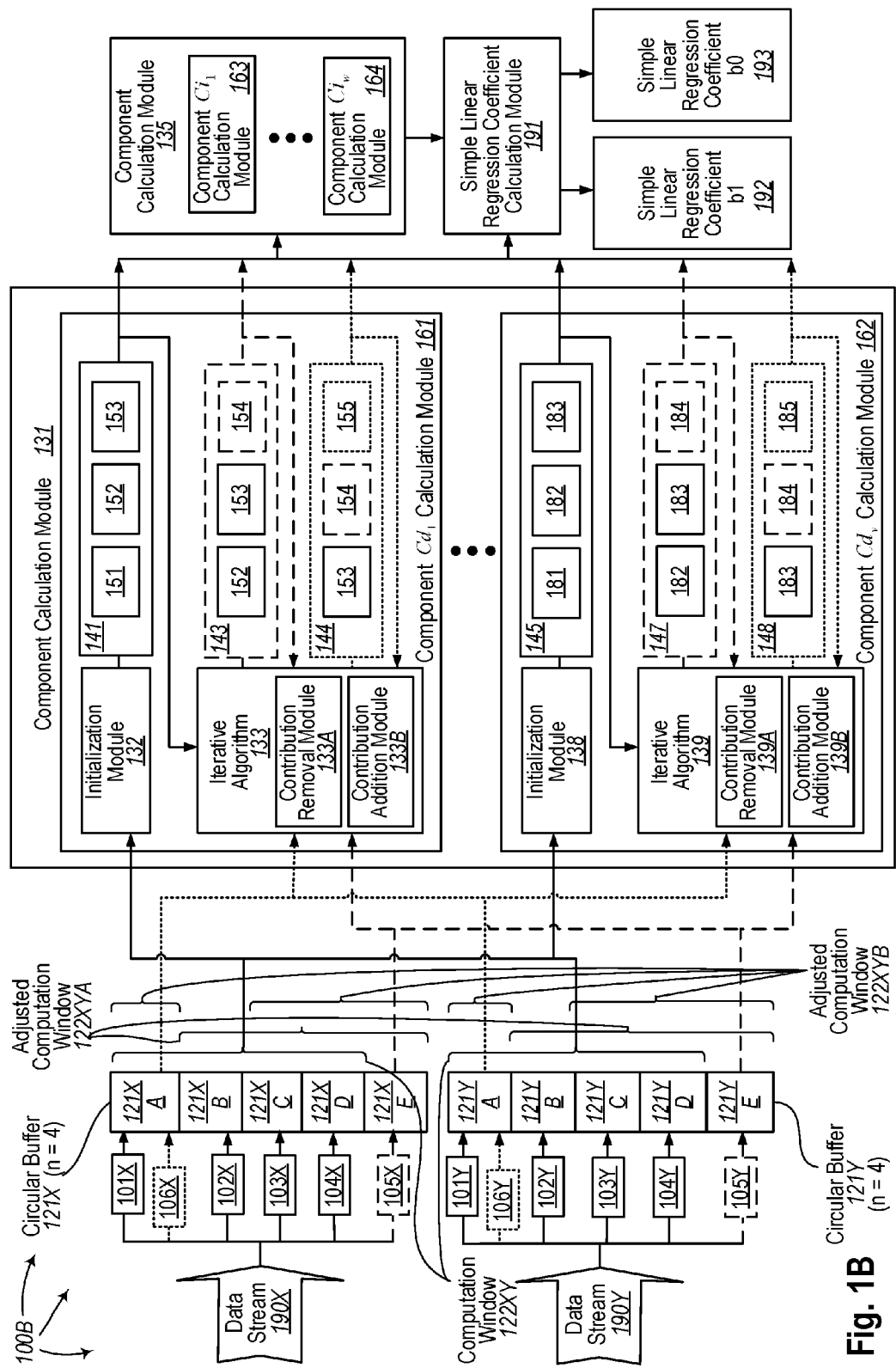
FIG. 1B illustrates an example computing device architecture that facilitates iteratively calculating simple linear regression coefficients for streamed data with two inputs with some components being directly iteratively calculated and some components being indirectly iteratively calculated.

FIG. 1B illustrates an example computing device architecture 100B that facilitates iteratively calculating simple linear regression coefficients for streamed data with two inputs with some (v ($1 \le v < p$)) components being directly iteratively calculated and some (w (w=p−v)) components being indirectly iteratively calculated. In certain implementations, the difference between computing device architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is described here. Number v in 100B may not be the same number v as in 100A, because some directly iteratively calculated components in 100A are indirectly iteratively calculated in 100B. In 100A, v=p≥1, but in 100B, $1 \le v < p$. Referring to FIG. 1B, computing device architecture 100B includes component calculation module 135. The output of components calculation module 131 may be used as the input of component calculation module 135, and the output of calculation modules 131 and 135 may be used as the input of simple linear regression coefficients calculation module 191, and simple linear regression coefficients calculation module 191 may generate simple linear regression coefficients b1 192 and b0 193. Component calculation module 135 generally includes w=p−v component calculation modules for indirectly iteratively calculating w components. For example, Component calculation module 135 includes calculation module 163 for indirectly iteratively calculating component $Ci_1$ and calculation module 164 for indirectly iteratively calculating component $Ci_w$, and there are w−2 component calculation modules between them. Indirectly iteratively calculating w components includes indirectly iteratively calculating each of the w components one by one. Indirectly iteratively calculating a component includes accessing and using one or more components other than the component itself. The one or more components may have been initialized, directly iteratively calculated or indirectly iteratively calculated.

Figure 1C:
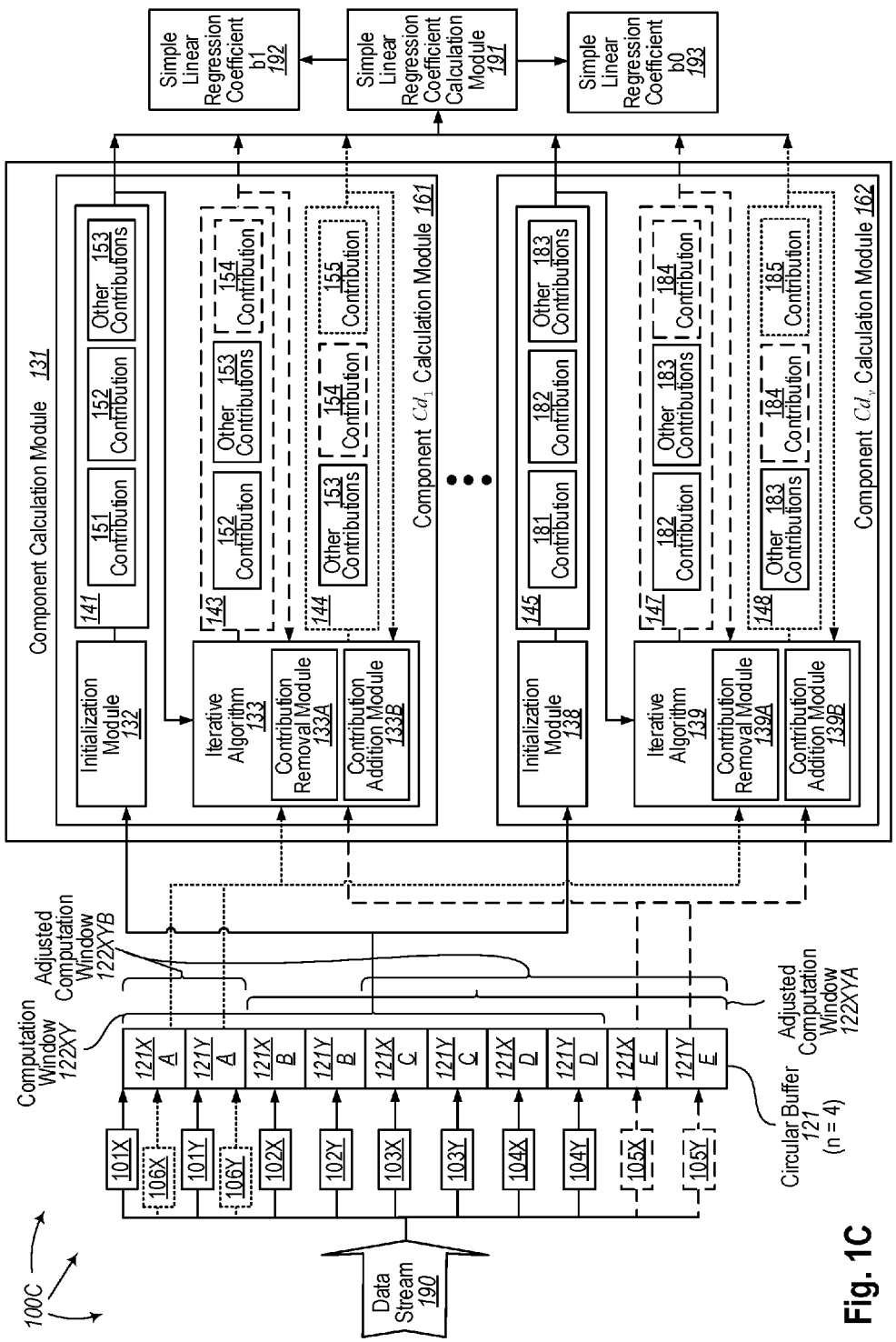
FIG. 1C illustrates an example computing device architecture that facilitates iteratively calculating simple linear regression coefficients for streamed data with a single input where data elements from two data streams are interleaved with all components being directly iteratively calculated.

FIG. 1C illustrates an example computing device architecture 100C that facilitates iteratively calculating simple linear regression coefficients for streamed data with a single input where data elements two data streams are interleaved with all (v=p≥1) components being directly iteratively calculated. In certain implementations, the difference between computing device architectures 100C and 100A may be that architecture 100C uses a single stream as input where two sets of data elements are interleaved and 100C uses a single circular buffer for storing data elements in a computation window. All parts except the input mode in 100C work in a similar way as those parts with the same reference numbers in 100A. Instead of repeating what have already been explained in the description about 100A, only the different part is described here. Referring to FIG. 1C, data stream 190 comprises two interleaved data streams 123X and 123Y in FIG. 1A. As pairs of streamed data elements are received, the streamed data elements may be placed in a location within a circular buffer 121. For example, data element 101X may be placed in location 121XA, data element 101Y may be placed in location 121YA, data element 102X may be placed in location 121XB, data element 102Y may be placed in location 121YB, data element 103X may be placed in location 121XC, data element 103Y may be placed in location 121YC, data element 104X may be placed in location 121XD, data element 104Y may be placed in location 121YD, data element 105X may be placed in location 121XE, and data element 105Y may be placed in location 121YE.

Subsequently, data element 106X and data element 106Y may be received. Data element 106X may be placed in location 121XA (overwriting data element 101X). Data element 106Y may be placed in location 121YA (overwriting data element 101Y).

As depicted in FIG. 1C, circular buffer 121 has ten locations, 121XA-121YE and a computation window of 8 (4 pairs of) data elements. Computation window 122XY contains the data elements used in simple linear regression calculation. Data elements in computation window 122XY are stored in the single buffer in an interleaved way. Computation window 122XY contains four data elements 101X, 102X, 103X and 104X from X variable and they are stored in 121XA, 121XB, 121XC and 121XD respectively. Computation window 122XY also contains four data elements 101Y, 102Y, 103Y and 104Y from Y variable and they are stored in 121YA, 121YB, 121YC and 121YD respectively. Data elements within computation window 122XY may rotate as received pairs of data elements are placed within circular buffer 121. For example, when data element 105X is placed in location 121XE and data element 105Y is placed in location 121YE, computation window 122XY transitions to adjusted computation window 122XYA. When data element 106X is subsequently placed in location 121XA and data element 106Y is subsequently placed in location 121YA, adjusted computation window 122XYA transitions to adjusted computation window 122XYB.

Figure 1D:
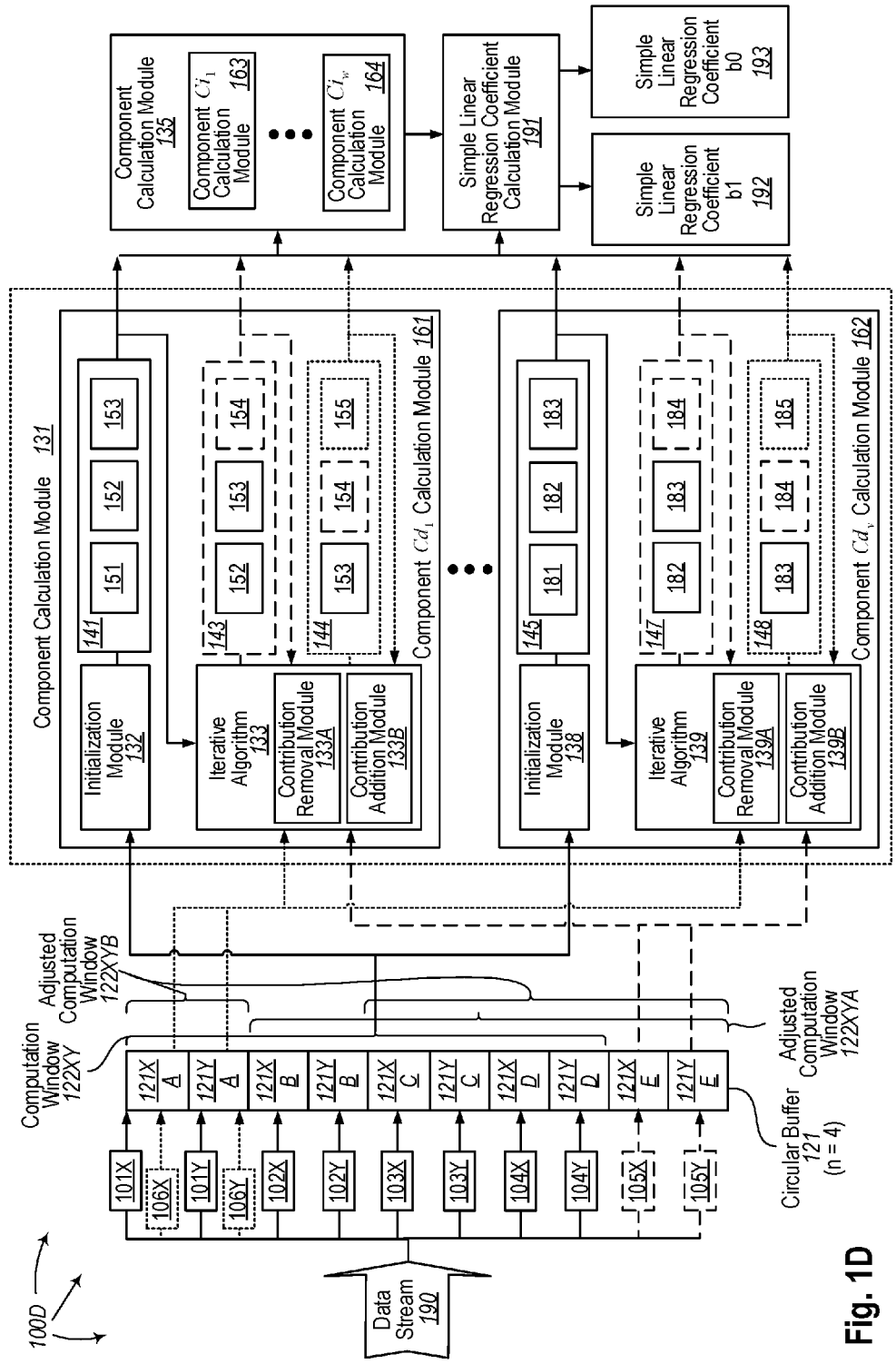
FIG. 1D illustrates an example computing device architecture that facilitates iteratively calculating simple linear regression coefficients for streamed data with a single input where data elements two data streams are interleaved with some components being directly iteratively calculated and some components being indirectly iteratively calculated.

FIG. 1D illustrates an example computing device architecture 100D that facilitates iteratively calculating simple linear regression coefficients for streamed data with a single input where data elements from two data streams are interleaved with some (v ($1 \leq v < p$)) components being directly iteratively calculated and some (w (w=p−v)) components being indirectly iteratively calculated. In certain implementations, the difference between computing device architectures 100D and 100C may be that architecture 100D includes a component calculation module 135. All parts except component calculation module 135 in 100D work in a similar way as those parts with the same reference numbers in 100C. Instead of repeating what have already been explained in the descriptions about 100A and 100C respectively, only the different part is described here. Number v in 100D may not be the same number v as in 100C, because some directly iteratively calculated components in 100C are indirectly iteratively calculated in 100D. In 100C, v=p≥1, but in 100D, $1 \leq v < p$. Referring to FIG. 1D, computing device architecture 100D includes component calculation module 135. Component calculation module 135 includes w=p−v component calculation modules for indirectly iteratively calculating w components. Indirectly iteratively calculating w components includes indirectly iteratively calculating each of the w components one by one. Indirectly iteratively calculating a component includes accessing and using one or more components other than the component itself. The one or more components may have been initialized, directly iteratively calculated or indirectly iteratively calculated.

Figure 2:
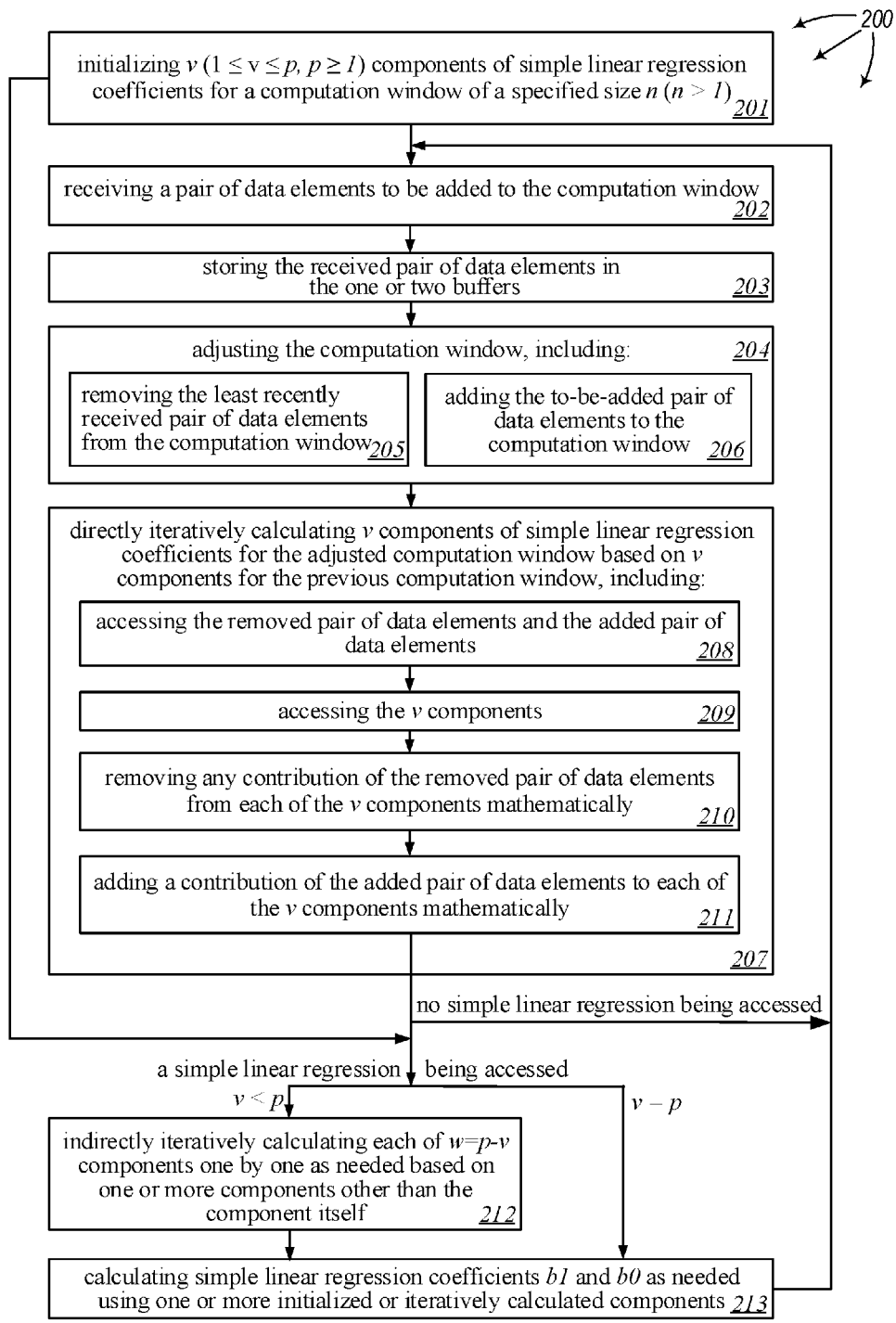
FIG. 2 illustrates a flow chart of an example method for iteratively calculating simple linear regression coefficients for streamed data.

FIG. 2 illustrates a flow chart of an example method 200 for iteratively calculating simple linear regression coefficients for streamed data. Method 200 will be described with respect to the components and data of computing device architectures 100A, 100B, 100C and 100D respectively.

Method 200 includes initializing v ($1 \leq v \leq p$, p≥1) components of simple linear regression coefficients for a computation window of a specified size n (n>1) of the buffer (201). The buffer is filled with the first n pairs of data elements for the first computation window. The computing device initializes one or more components one by one for the first computation window according to the component's definition based on the data elements in the computation window. For example for computing device architectures 100A, 100B, 100C and 100D, initialization module 132 may be used for calculating component $Cd_1$ 141 from pairs of data elements (101X, 101Y), (102X, 102Y), (103X, 103Y), and (104X, 104Y). As depicted, component $Cd_1$ 141 includes contribution 151, contribution 152, and other contributions 153. Contribution 151 is a contribution from a pair of data elements (101X, 101Y). Contribution 152 is a contribution from a pair of data elements (102X, 102Y). Other contributions 153 are contributions from pairs of data elements (103X, 103Y) and (104X, 104Y). Similarly, initialization module 138 may be used for calculating component $Cd_v$ 145 from pairs of data elements (101X, 101Y), (102X, 102Y), (103X, 103Y), and (104X, 104Y). As depicted, component $Cd_v$ 145 includes contribution 181, contribution 182, and other contributions 183. Contribution 181 is a contribution from a pair of data elements (101X, 101Y). Contribution 182 is a contribution from a pair of data elements (102X, 102Y). Other contributions 183 are contributions from pairs of data elements (103X, 103Y) and (104X, 104Y).

Method 200 includes receiving a pair of data elements to be added to the computation window (202). For example, a pair of data elements (105X, 105Y) may be received subsequent to receiving pairs of data elements (102X, 102Y), (103X, 103Y), and (104X, 104Y), which are to be added to the computation window. Method 200 includes storing the received pair of data elements in the one or two buffers (203). For example, for computing device architectures 100A and 100B, the pair of data elements (105X, 105Y) may be stored in location 121XE of buffer 121X and 121YE of buffer 121Y respectively, and for computing device architectures 100C and 100D, the pair of data elements (105X, 105Y) may be stored in locations 121XE and 121YE respectively in a single buffer 121.

Method 200 includes adjusting the computation window (204). For example, computation window 122XY may be transitioned to adjusted computation window 122XYA. Adjusting the computation window includes removing the least recently received pair of data elements from the computation window (205) and adding the to-be-added pair of data elements to the computation window (206). For example, a pair of data elements (101X, 101Y) is removed from computation window 122XY, and a pair of data elements (105X, 105Y) is added to computation window 122XY.

Method 200 includes directly iteratively calculating v ($1 \leq v \leq P$) components of simple linear regression coefficients for the adjusted computation window based on the one or more components for the previous computation window (207). For example, iterative algorithm 133 may be used for calculating component 143 (for adjusted computation window 122XYA) based on component 141 (for computation window 122XY), and iterative algorithm 139 may be used for calculating component 147 (for adjusted computation window 122XYA) based on component 145 (for computation window 122XY).

Directly iteratively calculating the v components of simple linear regression coefficients includes accessing the removed pair of data elements and the added pair of data elements (208). For example, iterative algorithm 133 may access data elements (101X, 101Y) and (105X, 105Y), and iterative algorithm 139 may also access data elements (101X, 101Y) and (105X, 105Y).

Directly iteratively calculating the v components of simple linear regression coefficients includes accessing each of the v components for the previous computation window (209). For example, iterative algorithm 133 may access component $Cd_1$ 141, and iterative algorithm 139 may access component $Cd_v$ 145.

Directly iteratively calculating one or more components of simple linear regression coefficients includes removing any contribution of the removed pair of data elements from each of the v components mathematically (210). For example, directly iteratively calculating 143 may include contribution removal module 133A removing contribution 151 (i.e., the contribution of a pair of data elements (101X, 101Y)) from component $Cd_1$ 141 mathematically, and directly iteratively calculating component $Cd_v$ 147 may include contribution removal module 139A removing contribution 181 (i.e., the contribution of a pair of data elements (101X, 101Y)) from component $Cd_v$ 145 mathematically.

Directly iteratively calculating the v components of simple linear regression coefficients includes adding a contribution of the added pair of data elements to each of the v components mathematically (211). For example, directly iteratively calculating component $Cd_1$ 143 may include contribution addition module 133B adding contribution 154 to component 141 mathematically, and directly iteratively calculating component $Cd_v$ 147 may include contribution addition module 139B adding contribution 184 to component $Cd_v$ 145 mathematically. Contribution 154 and 184 are contributions of a pair of data elements (105X, 105Y).

As depicted in FIGS. 1A, 1B, 1C and 1D, component $Cd_1$ 143 includes contribution 152 (a contribution from a pair of data elements (102X, 102Y)), other contributions 153 (contributions from pairs of data elements (103X, 103Y) and (104X, 104Y)), and contribution 154 (a contribution from a pair of data elements (105X, 105Y)). Similarly, component $Cd_v$ 147 includes contribution 182 (a contribution from a pair of data elements (102X, 102Y)), other contributions 183 (contributions from pairs of data elements (103X, 103Y) and (104X, 104Y)), and contribution 184 (a contribution from a pair of data elements (105X, 105Y)).

Simple linear regression coefficients may be calculated as needed, i.e., it only needs to be calculated when it is accessed, though the v components must be calculated whenever a pair of data elements is removed from and a pair of data elements is added to the computation window.

When no simple linear regression coefficients are accessed, Method 200 includes receiving a pair of data elements to be added to the computation window.

When simple linear regression coefficients are accessed and when v<p (i.e., not all components are directly iteratively calculated), Method 200 includes indirectly iteratively calculating w=p−v components one by one based on one or more components other than the component itself (212) and then calculating simple linear regression coefficients using one or more initialized or iteratively calculated components (213). For example, referring to FIG. 1B and FIG. 1D, calculation module 163 may be used for indirectly iteratively calculating component $Ci_1$, and calculation module 164 may be used for indirectly iteratively calculating component $Ci_w$. Calculation module 191 may then calculate simple linear regression coefficients b1 192 and b0 193 based on one or more components ranging from component $Cd_1$ 143 to component $Cd_v$ 147 and component $Ci_1$ to component $Ci_w$.

When simple linear regression coefficients are accessed and when v=p (i.e., all components are directly iteratively calculated), Method 200 includes calculating simple linear regression coefficients as needed using one or more iteratively calculated components (213). For example, referring to computing device architectures 100A and 100C, calculation module 191 may then calculate simple linear regression coefficients b1 192 and b0 193 using one or more calculated components ranging from component $Cd_1$ 143 to component $Cd_v$ 147.

202-211 may be repeated as additional pairs of data elements are received, and 212-213 may be repeated as needed. For example, subsequent to calculating components ranging from $Cd_1$ 143 to $Cd_v$ 147, a pair of data elements (106X, 106Y) may be received (202). The pair of data elements (106X, 106Y) may be placed in location 121XA overwriting data element 101X and in location 121YA overwriting data element 101Y respectively (203). Adjusted computation window 122XYA may be transitioned to adjusted computation window 122XYB (204) by removing the least recently received pair of data elements (102X, 102Y) (205) and adding the to-be-added pair of data elements (106X, 106Y) (206).

Iterative algorithm 133 may directly iteratively calculate component $Cd_1$ 144 (for adjusted computation window 122XYB) based on component $Cd_1$ 143 (for adjusted computation window 122XYA) (207). Iterative algorithm 133 may access the removed pair of data elements (102X, 102Y) and the added pair of data elements (106X, 106Y) (208). Iterative algorithm 133 may access component $Cd_1$ 143 (209). Directly iteratively calculating component $Cd_1$ 144 may include contribution removal module 133A removing contribution 152 (i.e., the contribution of the pair of data elements (102X, 102Y)) from component $Cd_1$ 143 mathematically (210). Directly iteratively calculating component $Cd_1$ 144 may include contribution addition module 133B adding contribution 155 (i.e., the contribution of the pair of data elements (106X, 106Y)) to component $Cd_1$ 143 mathematically (211). Similarly, iterative algorithm 139 may directly iteratively calculate component $Cd_v$ 148 (for adjusted computation window 122XYB) based on component $Cd_v$ 147 (for adjusted computation windows 122XYA) (207). Iterative algorithm 139 may access the removed pair of data elements (102X, 102Y) and the added pair of data elements (106X, 106Y) (208). Iterative algorithm 139 may access component $Cd_v$ 147 (209). Directly iteratively calculating component $Cd_v$ 148 may include contribution removal module 139A removing contribution 182 (i.e., the contribution of the pair of data elements (102X, 102Y)) from component $Cd_v$ 147 mathematically (210). Directly iteratively calculating component $Cd_v$ 148 may include contribution addition module 139B adding contribution 185 (i.e., the contribution of the pair of data elements (106X, 106Y)) to component $Cd_v$ 147 mathematically (211).

As depicted in FIGS. 1A, 1B, 1C and 1D, component $Cd_1$ 144 includes other contributions 153 (contributions of pairs of data elements (103X, 103Y) and (104X, 104Y)), contribution 154 (a contribution of the pair of data elements (105X, 105Y)), and contribution 155 (a contribution of the pair of data elements (106X, 106Y)), and component $Cd_v$ 148 includes other contributions 183 (contributions of pairs of data elements (103X, 103Y) and (104X, 104Y)), contribution 184 (a contribution of the pair of data elements (105X, 105Y)), and contribution 185 (a contribution of the pair of data elements (106X, 106Y)).

When simple linear regression coefficients are accessed and when v=p (i.e., all components are directly iteratively calculated), Method 200 includes calculating simple linear regression coefficients as needed using one or more iteratively calculated components (213). For example, referring to computing device architectures 100A and 100C, calculation module 191 may then calculate simple linear regression coefficients b1 192 and b0 193 using one or more calculated components ranging from component $Cd_1$ 144 to component $Cd_v$ 148.

When a pair of data elements is received, component $Cd_1$ 144 may be used for directly iteratively calculating a component $Cd_1$ for the adjusted computation window and component $Cd_v$ 148 may be used for directly iteratively calculating a component $Cd_v$ for the adjusted computation window.

Figure 3A:
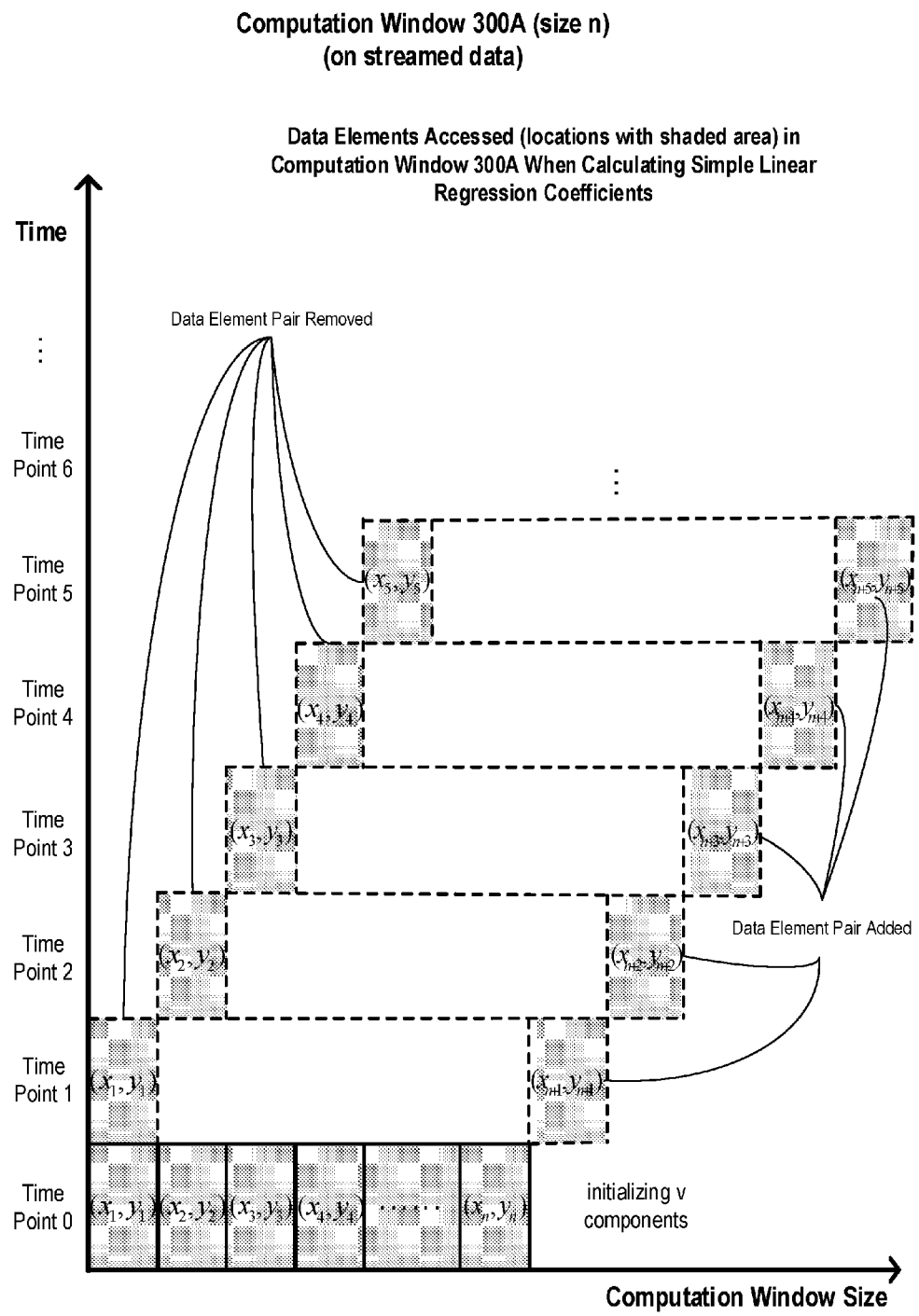
FIG. 3A illustrates data elements that are accessed from a computation window for iteratively performing simple linear regression coefficient calculation on streamed data. The computation window contains a fixed number of pairs of data elements from two variables. Each pair of data elements contains one data element from one variable and the other data element from the other variable.

FIG. 3A illustrates data elements that are accessed from, a computation window, computation window 300A for iteratively calculating simple linear regression coefficients on streamed data. The difference between a computation window and a computation set is that the data elements in a computation window are ordered (e.g., a data element is always removed from either the left end or the right end of a computation window and a data element is always added to either the right end or the left end of a computation window). For example, referring to FIG. 3A, a least recently received data element is always removed from the left end and a to-be-added data element is always added to the right end of computation window 300A. For computation window 300A, the first n data elements are accessed for calculating one or more components (p (p=v+w)) for the first computation window and then calculating simple linear regression coefficients as needed. As time progresses, a least recently received data element removed from computation window 300A and a to-be-added data elements for example, data element $x_{n+1}$, then $x_{n+2}$, then $x_{n+3}$, ... added to computation window 300A, are accessed for directly iteratively calculating v components, while all other data elements are not touched. The v components may be directly iteratively calculated from a removed data element, an added data element, for example, data element $x_{n+1}$, and the v components for the previous computation window. For a given iterative algorithm, v is a constant, so the number of operations for directly iteratively calculating v components is a constant, and the number of operations for indirectly iteratively calculating w=p−v components is also a constant. Thus, after calculation of the one or more components for the first computation window, computation workload is reduced and remains constant. The larger the n, the more substantial the reduction in computation workload.

FIG. 4A illustrates equations for calculating simple linear regression coefficients. Suppose a computation window $XY=\{(x_i, y_i)|i=1, \ldots, n\}$ contains the data elements to be involved in simple linear regression coefficient calculation, where data elements $x_1, x_2, x_3, x_4, \ldots, x_n$ are observed data from a predictor variable X and data elements $y_1, y_2, y_3, y_4, \ldots, y_n$ are observed data from a response variable Y, simple linear regression coefficients need to be calculated. Equation 401 is a traditional equation for calculating simple linear regression coefficient $b1_k$ which is a slope of a fitted regression line. Equation 402 is a traditional equation for calculating simple linear regression coefficient $b0_k$ which is an interception of the fitted regression line. Equation 403 is a traditional equation for calculating a sum $XS_k$ of all the data elements of X variable in computation window XY in the $k^{th}$ iteration. Equation 404 is a traditional equation for calculating a sum $YS_k$ of all the data elements of Y variable in computation window XY in the $k^{th}$ iteration. Equation 405 is a traditional equation for calculating a mean $\bar{x}_k$ of all the data elements of X variable in computation window XY in the $k^{th}$ iteration. Equation 406 is a traditional equation for calculating a mean $\bar{y}_k$ of all the data elements of Y variable in computation window XY in the $k^{th}$ iteration. Equation 407 is a traditional equation for calculating simple linear regression $b1_k$ in the $k^{th}$ iteration. Equation 408 is a traditional equation for calculating simple linear regression $b0_k$ in the $k^{th}$ iteration.

Assuming computation window XY of size n is changed with a pair of data elements $(x_r, y_r)$ ($1 \leq r \leq n$) being removed and a pair of data elements $(x_a, y_a)$ being added. Whenever a pair of data elements is removed and a pair of data elements is added, the computation window is considered as an adjusted computation window. A new iteration of calculation is started each time any component of simple linear regression coefficients is recalculated due to a data change in the computation window. Equation 409 may be used for calculating a sum $XS_{k+1}$ of all the data elements of X variable in adjusted computation window XY in the $k+1^{th}$ iteration. Equation 410 may be used for calculating a sum $YS_{k+1}$ of all the data elements of Y variable in adjusted computation window XY in the $k+1^{th}$ iteration. Equation 411 may be used for calculating a mean $\bar{x}_{k+1}$ of all the data elements of X variable in adjusted computation window XY in the $k+1^{th}$ iteration. Equation 412 may be used for calculating a mean $\bar{y}_{k+1}$ of all the data elements of Y variable in adjusted computation window XY in the $k+1^{th}$ iteration. Equation 413 may be used for calculating simple linear regression coefficient $b1_{k+1}$ for the adjusted computation window XY in the $k+1^{th}$ iteration. Equation 414 may be used for calculating simple linear regression coefficient $b0_{k+1}$ for the adjusted computation window XY in the $k+1^{th}$ iteration.

FIG. 4B illustrates some example components of simple linear regression coefficients and a few basic iterative component calculation equations that may be used in all example iterative algorithms. The following are some example components of simple linear regression coefficients.

$$XS_k = \sum_1^n x_i$$

$$YS_k = \sum_1^n y_i$$

$$\bar{x}_k = \frac{XS_k}{n} = \frac{1}{n}\sum_1^n x_i$$

$$\bar{y}_k = \frac{YS_k}{n} = \frac{1}{n}\sum_1^n y_i$$

$$XSS_k = \sum_1^n x_i^2$$

$$XV_k = \sum_1^n x_i^2 - n\bar{x}_k^2 = XSS_k - \frac{XS_k^2}{n} = XSS_k - n\bar{x}_k^2$$

$$SSDX_k = \sum_1^n \left(x_i - \frac{XS_k}{n}\right)^2 = \sum_1^n (x_i - \bar{x}_k)^2$$

$$SDXY_k = \sum_1^n (x_i - \bar{x}_k)(y_i - \bar{y}_k) = \sum_1^n \left(x_i - \frac{XS_k}{n}\right)(y_i - \bar{y}_k) =$$
$$\sum_1^n (x_i - \bar{x}_k)\left(y_i - \frac{YS_k}{n}\right) = \sum_1^n \left(x_i - \frac{XS_k}{n}\right)\left(y_i - \frac{YS_k}{n}\right)$$

$$SXY_k = \sum_1^n x_i y_i$$

$$x\sigma_k^2 = \frac{\sum_1^n x_i^2}{n} - \bar{x}_k^2 = \frac{\sum_1^n x_i^2}{n} - \left(\frac{XS_k}{n}\right)^2$$

-continued $$b1_k = \frac{\sum_1^n (x_i - \bar{x}_k)(y_i - \bar{y}_k)}{\sum_1^n (x_i - \bar{x}_k)^2} = \frac{\sum_1^n \left(x_i - \frac{XS_k}{n}\right)(y_i - \bar{y}_k)}{\sum_1^n \left(x_i - \frac{XS_k}{n}\right)^2} =$$

$$\frac{\sum_1^n (x_i - \bar{x}_k)\left(y_i - \frac{YS_k}{n}\right)}{\sum_1^n (x_i - \bar{x}_k)^2} = \frac{\sum_1^n \left(x_i - \frac{XS_k}{n}\right)\left(y_i - \frac{YS_k}{n}\right)}{\sum_1^n \left(x_i - \frac{XS_k}{n}\right)^2}$$

$$b0_k = \frac{YS_k}{n} - b1_k \frac{XS_k}{n} = \frac{YS_k}{n} - b1_k \bar{x}_k = \bar{y}_k - b1_k \frac{XS_k}{n} = \bar{y}_k - b1_k \bar{x}_k$$

$XS_k$, $YS_k$, $SSDX_k$, $SDXY_k$, $\bar{x}_k$, and $\bar{y}_k$, directly appear in the definition of simple linear regression coefficients, are components of simple linear regression coefficients. $SXY_k$, $XSS_k$, and $XV_k$, appear in a transform expression of simple linear regression coefficients, are also components of simple linear regression coefficients. Even a simple linear regression coefficient itself is considered as a component because it is the largest component appearing in the definition of the simple linear regression coefficient. Simple linear regression coefficients may be calculated based on one or more its components or combinations of them. For example, if $$SDXY_k = \sum_1^n (x_i - \bar{x}_k)(y_i - \bar{y}_k)$$

and $$SSDX_k = \sum_1^n (x_i - \bar{x}_k)^2$$

are known, simple linear regression coefficients may be calculated. If all components appeared in simple linear regression's definition equations or transform of the definition equations may be iteratively calculated, then simple linear regression coefficients may be iteratively calculated. Since multiple components of simple linear regression coefficients and even more combinations of the components exist, there are multiple ways (algorithms) supporting iterative simple linear regression coefficient calculation. The algorithms presented in this invention disclosure are just a few examples of iterative simple linear regression coefficient calculation algorithms which are not intend to cover all possible algorithms but just for illustration purposes. A sum $$\sum_1^n x_i$$

or a mean $$\frac{1}{n}\sum_1^n x_i$$

for X variable is a component to be used in several example iterative simple linear regression coefficient calculation algorithms, and the same is for Y variable, so four equations for iteratively calculating a sum or a mean of X and Y variables in adjusted computation window XY respectively are illustrated in FIG. 4B instead of in each example algorithm. Equation 415 may be used for directly iteratively calculating a sum $XS_{k+1}$ for X variable in adjusted computation window XY for the $k+1^{th}$ iteration when a sum $XS_k$ in computation window XY for the $k^{th}$ iteration is known. Equation 415 adds contributions of $x_a$ to $XS_k$ mathematically and removes contributions of $x_r$ from $XS_k$ mathematically to get $XS_{k+1}$. Equation 416 may be used for directly iteratively calculating a sum $YS_{k+1}$ for Y variable of adjusted computation window XY for the $k+1^{th}$ iteration when mean $YS_k$ for Y variable in computation window XY for the $k^{th}$ iteration is known. Equation 416 adds contributions of $y_a$ to $YS_k$ mathematically and removes contributions of $y_r$ from $YS_k$ mathematically to get $YS_{k+1}$. Equation 417 may be used for directly iteratively calculating a mean $\bar{x}_{+1}$ for X variable in adjusted computation window XY for the $k+1^{th}$ iteration when mean $\bar{x}_k$ for X variable in computation window XY for the $k^{th}$ iteration is known. Equation 417 adds contributions of $x_a$ to $\bar{x}_k$ mathematically and removes contributions of $x_r$ from $\bar{x}_k$ mathematically to get $\bar{x}_{k+1}$. Equation 418 may be used for directly iteratively calculating a mean $\bar{y}_{k+1}$ for Y variable in adjusted computation window XY for the $k+1^{th}$ iteration when mean $\bar{y}_k$ for Y variable of computation window XY for the $k^{th}$ iteration is known. Equation 418 adds contributions of $y_a$ to $\bar{y}_k$ mathematically and removes contributions of $y_r$ from $\bar{y}_k$ mathematically to get $y_{k+1}$.

FIG. 4C illustrates the first example iterative simple linear regression calculation algorithm (iterative algorithm 1) for iteratively performing simple linear regression based on iteratively calculated simple linear regression components $XS_{k+1}$ or $\bar{x}_{+1}$, $YS_{k+1}$ or $\bar{y}_{k+1}$, $XV_{k+1}$, and $SXY_{k+1}$. Equation 415 and equation 416 may be used for directly iteratively calculating a sum $XS_{k+1}$ for X variable and a sum $YS_{k+1}$ for Y variable for the $k+1^{th}$ iteration based on a sum $XS_k$ and a sum $YS_k$ known for the $k^{th}$ iteration respectively. Equation 417 and equation 418 may be used for directly iteratively calculating a mean $\bar{x}_{k+1}$ for X variable and a mean $y_{k+1}$ for Y variable for the $k+1^{th}$ iteration based on a mean $\bar{x}_k$ and a mean $\bar{y}_k$ known for the $k^{th}$ iteration respectively. Equation 419 is a traditional equation for calculating a square sum $XSS_k$ for computation window XY. Equation 420 is a traditional equation for calculating a square sum $XSS_{k+1}$ on adjusted computation window XY where a pair of data elements $(x_r, y_r)$ is removed and a pair of data elements $(x_a, y_a)$ is added. Equation 421 may be used for directly iteratively calculating a square sum $XSS_{k+1}$ for the $k+1^{th}$ iteration once $XSS_k$ for the $k^{th}$ iteration is known. Equation 421 removes contributions of $(x_r, y_r)$ from $XSS_k$ mathematically and adds contributions of $(x_a, y_a)$ to $XSS_k$ mathematically to get $XSS_{k+1}$. Once $XS_k$ or $\bar{x}_k$ and $XSS_k$ are known, equations 422 may be used for calculating $XV_k$, and once $XS_{k+1}$ or $\bar{x}_{k+1}$ and $XSS_{k+1}$ are known, equations 423 may be used for indirectly iteratively calculating $XV_{k+1}$. Equations 422 comprise multiple equations but only one of them is needed depending on if a sum or a mean is available. Equations 423 comprise multiple equations but only one of them is needed depending on if a sum or a mean is available. Equation 424 is a traditional equation for calculating component $$SXY_k = \sum_1^n x_i y_i$$

for the $k^{th}$ iteration for computation window XY. Equation 425 is a traditional equation for calculating component $SXY_{k+1}$ for the $k+1^{th}$ on adjusted computation window XY where a pair of data elements $(x_r, y_r)$ is removed and a pair of data elements $(x_a, y_a)$ is added. Equation 426 may be used for directly iteratively calculating component $SXY_{k+1}$ for the $k+1^{th}$ on adjusted computation window XY where a pair of data elements $(x_r, y_r)$ is removed and a pair of data elements $(x_a, y_a)$ is added assuming component $SXY_k$ for the $k^{th}$ iteration is known. Equation 426 removes contributions of $(x_r, y_r)$ from $SXY_k$ mathematically and adds contributions of $(x_a, y_a)$ to $SXY_k$ mathematically to get $SXY_{k+1}$. Equations 427 may be used for indirectly iteratively calculating simple linear regression coefficient $b1_{k+1}$ for the $k+1^{th}$ iteration once components $XS_{k+1}$ and/or $\bar{x}_{k+1}$, $YS_{k+1}$ and/or $\bar{y}_{k+1}$, $XV_{k+1}$, and $SXY_{k+1}$ are calculated. Equations 427 comprise multiple equations but only one of them is needed depending on if a sum or a mean or both are available. Equation 428 may be used for indirectly iteratively calculating simple linear regression coefficient $b0_{k+1}$ for the $k+1^{th}$ iteration once components $XS_{k+1}$ and/or $\bar{x}_{k+1}$, $YS_{k+1}$ and/or $\bar{y}_{k+1}$, and $b1_{k+1}$ are calculated. Equations 428 comprise multiple equations but only one of them is needed depending on if a sum or a mean or both are available for variable X and variable Y respectively.

FIG. 4D illustrates the second example iterative simple linear regression coefficient calculation algorithm (iterative algorithm 2) for iteratively calculating simple linear regression coefficients based on iteratively calculated components $XS_{k+1}$ and/or $\bar{x}_{k+1}$, $YS_{k+1}$ and/or $\bar{y}_{k+1}$, $SSDX_k$, and $SDXY_k$. Equation 415 and equation 416 may be used for directly iteratively calculating a sum $XS_{k+1}$ and a sum $YS_{k+1}$ for the $k+1^{th}$ iteration based on a sum $XS_k$ and a sum $YS_k$ known for the $k^{th}$ iteration respectively. Equation 417 and equation 418 may be used for directly iteratively calculating a mean $\bar{x}_{k+1}$ for X variable and a mean $\bar{y}_{k+1}$ for Y variable for the $k+1^{th}$ iteration based on a mean $\bar{x}_k$ and a mean $\bar{y}_k$ known for the $k^{th}$ iteration respectively. Equation 429 is a traditional equation for calculating component $$SSDX_k = \sum_1^n (x_i - \bar{x}_k)^2$$

for the $k^{th}$ iteration on computation window XY assuming $\bar{x}_k$ is known. Equation 430 is a traditional equation for calculating $SSDX_{k+1}$ for the $k+1^{th}$ iteration on adjusted computation window XY where a pair of data elements $(x_r, y_r)$ is removed and a pair of data elements $(x_a, y_a)$ is added assuming $\bar{x}_{k+1}$ is known. Equations 431 are equations for directly iteratively calculating $SSDX_{k+1}$ for the $k+1^{th}$ on adjusted computation window XY where a pair of data elements $(x_r, y_r)$ is removed and a pair of data elements $(x_a, y_a)$ is added assuming $SSDX_k$ for the $k^{th}$ iteration is known. Equations 431 remove contributions of $(x_r, y_r)$ from $SSDX_k$ mathematically and add contributions of $(x_a, y_a)$ to $SSDX_k$ mathematically to get $SSDX_{k+1}$. Equations 431 comprise multiple equations but only one of them is needed depending on if a sum or a mean or both are available for variable X. Equation 432 is a traditional equation for calculating component $$SDXY_k = \sum_1^n (x_i - \bar{x}_k)(y_i - \bar{y}_k)$$

for the $k^{th}$ iteration for computation window XY assuming $\bar{x}_k$ and $\bar{y}_k$ are known. Equation 433 is a traditional equation for calculating component $SDXY_{k+1}$ for the $k+1^{th}$ iteration for adjusted computation window XY where a pair of data elements $(x_r, y_r)$ is removed and a pair of data elements $(x_a, y_a)$ is added assuming components $\bar{x}_{k+1}$ and $\bar{y}_{k+1}$ are known. Equations 434 may be used for directly iteratively calculating component $SDXY_{k+1}$ for the $k+1^{th}$ iteration for adjusted computation window XY where a pair of data elements $(x_r, y_r)$ is removed and a pair of data elements $(x_a, y_a)$ is added assuming components $\bar{x}_{k+1}$, $\bar{y}_{k+1}$ and $SDXY_k$ are known. Equations 434 remove contributions of $(x_r, y_r)$ from component $SDXY_k$ mathematically and add contributions of $(x_a, y_a)$ to component $SDXY_k$ mathematically to get component $SDXY_{k+1}$. Equations 434 comprise multiple equations but only one of them is needed depending on if a sum or a mean or both are available for variable X and variable Y respectively. Equation 435 may be used for indirectly iteratively calculating simple linear regression coefficient $b1_{k+1}$ for the $k+1^{th}$ iteration for adjusted computation window XY once components $SSDX_{k+1}$, and $SDXY_{k+1}$ are calculated. Equation 436 may be used for indirectly iteratively calculating simple linear regression coefficient $b0_{k+1}$ for the $k+1^{th}$ iteration once components $XS_{k+1}$ and/or $\bar{x}_{k+1}$, $YS_{k+1}$ and/or $\bar{y}_{k+1}$, and $b1_{k+1}$ are calculated. Equations 436 comprise multiple equations but only one of them is needed depending on if a sum or a mean or both are available for variable X and variable Y respectively.

FIG. 4E illustrates the third example iterative simple linear regression coefficient calculation algorithm (iterative algorithm 3) for iteratively calculating simple linear regression coefficients based on iteratively calculated components $XS_{k+1}$ or $\bar{x}_{k+1}$, $YS_{k+1}$ or $\bar{y}_{k+1}$, $XSS_{k+1}$, and $SXY_{k+1}$. Equation 415 and equation 416 may be used for directly iteratively calculating a sum $XS_{k+1}$ and a sum $YS_{k+1}$ for the $k+1^{th}$ iteration based on a sum $XS_k$ and a sum $YS_k$ known for the $k^{th}$ iteration respectively. Equation 417 and equation 418 may be used for directly iteratively calculating a mean $\bar{x}_{k+1}$ and a mean $\bar{y}_{k+1}$ for the $k+1^{th}$ iteration based on a mean $\bar{x}_k$ and a mean $\bar{y}_k$ known for the $k^{th}$ iteration respectively. Equation 437 is a traditional equation for calculating component $$XSS_k = \sum_1^n x_i^2$$

for the $k^{th}$ iteration for computation window XY. Equation 438 is a traditional equation for calculating component $XSS_{k+1}$ for the $k+1^{th}$ iteration for adjusted computation window XY where a pair of data elements $(x_r, y_r)$ is removed and a pair of data elements $(x_a, y_a)$ is added assuming $\bar{x}_{k+1}$ is known. Equation 439 may be used for directly iteratively calculating component $XSS_{k+1}$ for the $k+1^{th}$ for adjusted computation window XY where a pair of data elements $(x_r, y_r)$ is removed and a pair of data elements $(x_a, y_a)$ is added assuming component $XSS_k$ for the $k^{th}$ iteration is known. Equation 439 removes contributions of $(x_r, y_r)$ from component $XSS_k$ mathematically and adds contributions of $(x_a, y_a)$ to component $XSS_k$ mathematically to get component $XSS_{k+1}$. Equation 440 is a traditional equation for calculating component $$SXY_k = \sum_1^n x_i y_i$$

for the $k^{th}$ iteration for computation window XY. Equation 441 is a traditional equation for calculating component $SXY_{k+1}$ for the $k+1^{th}$ iteration for adjusted computation window XY where a pair of data elements $(x_r, y_r)$ is removed and a pair of data element $(x_a, y_a)$ is added. Equation 442 may be used for directly iteratively calculating component $SXY_{k+1}$ for the $k+1^{th}$ iteration on adjusted computation window XY where a pair of data elements $(x_r, y_r)$ is removed and a pair of data element $(x_a, y_a)$ is added assuming component $SXY_k$ is known. Equation 442 adds contributions of $(x_a, y_a)$ to $SXY_k$ mathematically and removes contributions of $(x_r, y_r)$ from $SXY_k$ mathematically to get $SXY_{k+1}$. Equations 443 are equations for indirectly iteratively performing simple linear regression $b1_{k+1}$ for the $k+1^{th}$ iteration for adjusted computation window XY once components $XS_{k+1}$ or $\bar{x}_{+1}$, $YS_{k+1}$ or $\bar{y}_{k+1}$, $XSS_{k+1}$, and $SXY_{k+1}$ are calculated. Equations 443 comprise multiple equations but only one of them is needed depending on if a sum or a mean or both are available. Equation 444 may be used for indirectly iteratively calculating simple linear regression coefficient $b0_{k+1}$ for the $k+1^{th}$ iteration once components $XS_{k+1}$ and/or $\bar{x}_{+1}$, $YS_{k+1}$ and/or $\bar{y}_{k+1}$, and $b1_{k+1}$ are calculated. Equations 444 comprise multiple equations but only one of them is needed depending on if a sum or a mean or both are available for variable X and variable Y respectively.

To demonstrate iterative simple linear regression coefficient calculation algorithms and their comparison against traditional algorithms, three examples are given below. Three computation windows of data elements are used. For traditional algorithms, the calculations for all three computation windows are exactly the same. For iterative algorithms, initialization of one or more components is performed for the first computation window, and iterative calculations are performed for the second and third computation windows.

FIG. 5A illustrates an example of calculating simple linear regression coefficients for XY Data Stream 501 using traditional algorithms. The data elements of XY computation window 503 come from XY Data Stream 501. XY computation window size 502 (n) is 4. Firstly, a mean $\bar{x}_1$ for X variable and a mean $\bar{y}_1$ for Y variable are calculated for XY computation window. Then, $$\sum_{1}^{4}(x_i - \bar{x}_1)(y_i - \bar{y}_1)$$

and $$\sum_{1}^{4}(x_i - \bar{x}_1)^2$$

are calculated based on each data elements in the computation window and $\bar{x}_1$ and $\bar{y}_1$. Finally, simple linear regression coefficients $b1_1$ and $b0_1$ are calculated. For example, for X variable in XY computation window 505 mean $\bar{x}_1$ is calculated to be 4.5. Calculating mean $\bar{x}_1$ includes 1 division operation and 3 addition operations. Similarly, for Y variable in XY computation window 506 mean $\bar{y}_1$ is calculated to be 5. Calculating mean $y_1$ includes 1 division operation and 3 addition operations. Then, $$\sum_{1}^{4}(x_i - \bar{x}_1)(y_i - \bar{y}_1)$$

is calculated to be 22 using two means $\bar{x}_1$ and $\bar{y}_1$ and the data elements in XY computation window 503. Calculating $$\sum_{1}^{4}(x_i - \bar{x}_1)(y_i - \bar{y}_1)$$

includes 4 multiplications, 3 additions and 8 subtractions.

$$\sum_{1}^{4}(x_i - \bar{x}_1)^2$$

is calculated to be 29 based on mean $\bar{x}_1$ and the data elements in XY computation window 503. Calculating $$\sum_{1}^{4}(x_i - \bar{x}_1)^2$$

includes 4 multiplications, 3 additions and 4 subtractions. Finally, simple linear regression coefficient $b1_1$ is calculated to be 0.7586206896551724 based on the computing results of $$\sum_{1}^{4}(x_i - \bar{x}_1)(y_i - \bar{y}_1)$$

and $$\sum_{1}^{4}(x_i - \bar{x}_1)^2.$$

and simple linear regression coefficient $b0_1$ is calculated to be 1.5862068965517241 based on components $\bar{x}_1$, $\bar{y}_1$ and $b1_1$. Calculating $b1_1$ includes 1 division. Calculating $b0_1$ includes 1 multiplication and 1 subtraction. Thus, there is a total of 3 divisions, 9 multiplications, 12 additions and 13 subtractions when calculating said simple linear regression.

The data elements of XY computation window 504 come from XY Data Stream 501. XY computation window 504 contains the data elements in XY computation window 503 but has removed a pair of data elements $(x_r, y_r)$ and added a pair of data elements $(x_a, y_a)$. The computation window size stays the same. XY computation window size 502 (n) is 4.

The same equations and steps used in calculating simple linear regression coefficients $b1_1$ and $b0_1$ for XY computation window 503 may be used for calculating simple linear regression coefficients $b1_2$ and $b0_2$ for XY computation window 504. Since there is no change on the computation window size, equations and steps, there are also 3 divisions, 9 multiplications, 12 additions and 13 subtractions when calculating $b1_2$ and $b0_2$. $b1_2$ is calculated to be 0.3846153846153846 and $b0_2$ is calculated to be 3.1538461538461539.

The data elements of XY computation window 505 come from XY Data Stream 501. XY computation window 505 contains the data elements in XY computation window 504 but has removed a pair of data elements $(x_r, y_r)$ and added a pair of data element $(x_a, y_a)$. The computation window size stays the same. XY computation window size 502 (n) is 4.

The same equations and steps used in calculating simple linear regression coefficients $b1_2$ and $b0_2$ for X computation window 504 may be used for calculating simple linear regression coefficients $b1_3$ and $b0_3$ for XY computation window 505. Since there is no change on the computation window size, equations and steps, there are also 3 divisions, 9 multiplications, 12 additions and 13 subtractions when calculating $b1_3$ and $b0_3$. $b1_3$ is calculated to be 0.7627118644067797, and $b0_3$ is calculated to be 1.271186440677965975.

For a computation window of n pairs of data elements, traditional algorithms typically use 3 divisions, 2n+1 multiplications, 4(n−1) additions and 3n+1 subtractions when calculating simple linear regression coefficients without any optimization.

FIG. 5B illustrates an example of calculating simple linear regression coefficients using iterative algorithm 1. A mean instead of a sum is used in the example. The calculations for calculating simple linear regression coefficients $b1_1$ and $b0_1$ for XY computation window 503 are essentially the same as using traditional algorithms shown in FIG. 5A but with additional computation for $XSS_1$ and $SXY_1$. $XSS_1$ and $SXY_1$ are prepared to be used in calculating simple linear regression coefficients $b1_2$ and $b0_2$ using iterative algorithm 1. Calculating $XSS_1$ includes additionally 4 multiplications and 3 additions, and calculating $SXY_1$ includes additionally 4 multiplications and 3 additions, so there is a total of 3 divisions, 17 multiplications, 18 additions, and 13 subtractions for calculating simple linear regression coefficients $b1_1$ and $b0_1$.

However, for computation window 504, simple linear regression coefficients $b1_2$ and $b0_2$ may be iteratively calculated based on $XSS_1$ and $SXY_1$ calculated in the previous iteration. Equations 417 and 418 may be used for iteratively calculating means $\bar{x}_2$ and $\bar{y}_2$ using previously calculated $\bar{x}_1$ and $\bar{y}_1$ respectively. Calculating $\bar{x}_2$ and $\bar{y}_2$ includes 2 divisions, 2 additions and 2 subtractions. Equation 421 may be used for iteratively calculating $XSS_2$ using previously calculated $XSS_1$. Calculating $XSS_2$ includes 2 multiplications, 1 addition and 1 subtraction. Equations 423 may be used for iteratively calculating $XV_2$ using previously calculated $XV_1$. Calculating $XV_2$ includes 2 multiplications and 1 subtraction. Equation 426 may be used for iteratively calculating $SXY_2$ based on previously calculated $SXY_1$. Calculating $SXY_2$ includes 2 multiplications, 1 addition and 1 subtraction. Equations 427 and 428 may be used for calculating simple linear regression coefficients $b1_2$ and $b0_2$ based on the iteratively calculated $\bar{x}_2, \bar{y}_2, XV_2$ and $SXY_2$. Calculating $b1_2$ and $b0_2$ using equations 427 and 428 includes 1 division, 3 multiplications and 2 subtractions. Thus, the total operations include 3 divisions, 9 multiplications, 4 additions, and 7 subtractions for calculating simple linear regression coefficients $b1_2$ and $b0_2$. $b1_2$ is calculated to be 0.3846153846153846 by iterative algorithm 1 which is the same as the $b1_2$ calculated based on traditional algorithms (see FIG. 5A Cont'd 1). $b0_2$ is calculated to be 3.1538461538461539 by iterative algorithm 1 which is the same as the $b0_2$ calculated based on traditional algorithms (see FIG. 5A Cont'd 1).

Equations 417, 418, 422, 423, 426, 427 and 428 may also be used for iteratively calculating simple linear regression coefficients $b1_3$ and $b0_3$ for XY computation window 505. These calculations also include 3 divisions, 9 multiplications, 4 additions, and 7 subtractions for calculating simple linear regression coefficients $b1_3$ and $b0_3$. $b1_3$ is calculated to be 0.7627118644067797 by iterative algorithm 1, which is the same as the $b1_3$ calculated by traditional algorithms (see FIG. 5A Cont'd 2). $b0_3$ is calculated to be 1.271186440677965975 by iterative algorithm 1, which is the same as the $b0_3$ calculated by traditional algorithms (see FIG. 5A Cont'd 2). As such, the number of operations used by iterative algorithm 1 is (potentially substantially) less than that used by traditional algorithms.

FIG. 5C illustrates an example of calculating simple linear regression coefficients using iterative algorithm 2. The calculations for calculating simple linear regression coefficients $b1_1$ and $b0_1$ for XY computation window 503 are not iterative because no previous computing results may be reused. Equation 405 may be used for calculating a mean $\bar{x}_1$ for X variable in XY computation window 503. Equation 406 may be used for calculating a mean $\bar{y}_1$ for Y variable in XY computation window 503. Calculating $\bar{x}_1$ and $\bar{y}_1$ includes 2 divisions and 6 additions. Equation 429 may be used for calculating $SSDX_1$ for XY computation window 503. Calculating $SSDX_1$ includes 4 multiplications, 3 additions and 4 subtractions. Equation 432 may be used for calculating $SDXY_1$ for XY computation window 503. Calculating $SDXY_1$ includes 4 multiplications, 3 additions and 8 subtractions. Equation 435 may be used for calculating simple linear regression coefficient $b1_1$ and equation 436 for $b0_1$ once $SSDX_1$ and $SDXY_1$ are calculated. Calculating $b1_1$ and $b0_1$ using equations 435 and 436 includes 1 division, 1 multiplication and 1 subtraction. Thus, there is a total of 3 divisions, 9 multiplications, 12 additions, and 13 subtractions for calculating simple linear regression coefficients $b1_1$ and $b0_1$.

However, for XY computation window 504, simple linear regression coefficients $b1_2$ and $b0_2$ may be calculated iteratively based on $SSDX_1$ and $SDXY_1$ calculated in the previous iteration. Equations 417 and 418 may be used for iteratively calculating means $\bar{x}_2$ and $\bar{y}_2$ using previously calculated $\bar{x}_1$ and $\bar{y}_1$ respectively. Calculating $\bar{x}_2$ and $\bar{y}_2$ includes 2 divisions, 2 additions and 2 subtractions. Equation 431 may be used for iteratively calculating $SSDX_2$ using previously calculated $SSDX_1$. Calculating $SSDX_2$ includes 1 multiplication, 3 additions and 2 subtractions. Equation 434 may be used for iteratively calculating $SDXY_2$ based on previously calculated $SDXY_1$. Calculating $SDXY_2$ includes 2 multiplications, 2 additions and 4 subtractions. Equation 435 may be used for calculating simple linear regression coefficient $b1_2$ and equation 436 for $b0_2$ based on the iteratively calculated $SSDX_2$ and $SDXY_2$. Calculating $b1_2$ and $b0_2$ using equations 435 and 436 includes 1 division, 1 multiplication and 1 subtraction. Thus, the total operations include 3 divisions, 4 multiplications, 7 additions, and 9 subtractions for calculating simple linear regression coefficients $b1_2$ and $b0_2$. $b1_2$ is calculated to be 0.3846153846153846 by iterative algorithm 2, which is the same as the $b1_2$ calculated based on traditional algorithms (see FIG. 5A Cont'd 1). $b0_2$ is calculated to be 3.1538461538461539 by iterative algorithm 2, which is the same as the $b0_2$ calculated based on traditional algorithms (see FIG. 5A Cont'd 1).

Equations 417, 418, 431, 434, 435 and 436 may also be used for iteratively calculating simple linear regression coefficients $b1_3$ and $b0_3$ for XY computation window 505. These calculations also include 3 divisions, 4 multiplications, 7 additions, and 9 subtractions for calculating simple linear regression coefficients $b1_3$ and $b0_3$. $b1_3$ is calculated to be 0.7627118644067797 by iterative algorithm 2, which is the same as the $b1_3$ calculated by traditional algorithms (see FIG. 5A Cont'd 2). $b0_3$ is calculated to be 1.271186440677965975 by iterative algorithm 2, which is the same as the $b0_3$ calculated by traditional algorithms (see FIG. 5A Cont'd 2). As such, the number of operations used by iterative algorithm 2 is (potentially substantially) less than that used by traditional algorithms.

FIG. 5D illustrates an example of calculating simple linear regression coefficients using iterative algorithm 3. The calculations for calculating simple linear regression coefficients $b1_1$ and $b0_1$ for XY computation window 503 are not iterative because no previous computing results may be reused. Equation 405 may be used for calculating a mean $\bar{x}_1$ for X variable in XY computation window 505. Equation 406 may be used for calculating a mean $\bar{y}_1$ for Y variable in XY computation window 506. Calculating $\bar{x}_1$ and $\bar{y}_1$ includes 2 divisions and 6 additions. Equation 437 may be used for calculating $XSS_1$ for XY computation window 503. Calculating $XSS_1$ includes 4 multiplications and 3 additions. Equation 440 may be used for calculating $SXY_1$ for XY computation window 503. Calculating $SXY_1$ includes 4 multiplications and 3 additions. Equations 443 and 444 may be used for calculating simple linear regression coefficients $b1_1$ and $b0_1$ once $\bar{x}_1$, $\bar{y}_1$, $XSS_1$ and $SXY_1$ are calculated. Calculating $b1_1$ and $b0_1$ using equations 443 and 444 includes 1 division, 4 multiplications and 3 subtractions. Thus, there is a total of 3 divisions, 12 multiplications, 12 additions, and 3 subtractions for calculating simple linear regression coefficients $b1_1$ and $b0_1$.

However, for XY computation window 504, simple linear regression coefficients $b1_2$ and $b0_2$ may be calculated iteratively based on $\bar{x}_1$, $\bar{y}_1$, $XSS_1$ and $SXY_1$ calculated in the previous iteration. Equations 417 and 418 may be used for iteratively calculating means $\bar{x}_2$ and $\bar{y}_2$ using previously calculated $\bar{x}_1$ and $\bar{y}_1$ respectively. Calculating $\bar{x}_2$ and $\bar{y}_2$ includes 2 divisions, 2 additions and 2 subtractions. Equation 439 may be used for iteratively calculating $XSS_2$ using previously calculated $XSS_1$. Calculating $XSS_1$ includes 2 multiplications, 1 addition and 1 subtraction. Equations 442 may be used for iteratively calculating $SXY_2$ based on previously calculated $SXY_1$. Calculating $SXY_2$ includes 2 multiplications, 1 addition and 1 subtraction. Equation 443 may be used for calculating simple linear regression coefficient $b1_2$ and equation 444 for $b0_2$ based on the iteratively calculated $\bar{x}_2$, $\bar{y}_2$, $XSS_2$, and $SXY_2$. Calculating $b1_2$ and $b0_2$ using equations 443 and 444 includes 1 division, 4 multiplications, and 3 subtractions. Thus, the total operations include 3 divisions, 8 multiplications, 4 additions, and 7 subtractions for calculating simple linear regression coefficients $b1_2$ and $b0_2$. $b1_2$ is calculated to be 0.3846153846153846 by iterative algorithm 3, which is the same as the $b1_2$ calculated based on traditional algorithms (see FIG. 5A Cont'd 1). $b0_2$ is calculated to be 3.1538461538461539 by iterative algorithm 3, which is the same as the $b0_2$ calculated based on traditional algorithms (see FIG. 5A Cont'd 1).

Equations 417, 418, 439, 442, 443 and 444 may also be used for iteratively calculating simple linear regression coefficients $b1_3$ for XY computation window 505. These calculations also include 3 divisions, 8 multiplications, 4 additions, and 7 subtractions for calculating simple linear regression coefficients $b1_3$ and $b0_3$. $b1_3$ is calculated to be 0.7627118644067797 by iterative algorithm 3, which is the same as the $b1_3$ calculated by traditional algorithms (see FIG. 5A Cont'd 2). $b0_3$ is calculated to be 1.271186440677965975 by iterative algorithm 3, which is the same as the $b0_3$ calculated by traditional algorithms (see FIG. 5A Cont'd 2). As such, the number of operations used by iterative algorithm 3 is (potentially substantially) less than that used by traditional algorithms.

FIG. 6 illustrates computational loads for traditional algorithms and iterative algorithms for n=4. As depicted, there is no much difference on the numbers of division, multiplication, addition, and subtraction operations using any one of the iterative algorithms compared to the traditional algorithms.

FIG. 7 illustrates computational loads for traditional algorithms and iterative algorithms for n=1,000,000. As depicted, there are substantially fewer multiplication, addition, and subtraction operations using any one of the iterative algorithms than using traditional algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computing-device-based computing system comprising one or more computing devices, each of the one or more computing devices comprising one or more processors, the computing-device-based computing system having access to one or two data streams, the computing system comprising one or more storage media, the one or more storage media comprising one or two buffers for storing streamed data elements, a computing-system-implemented method for calculating simple linear regression coefficients for a specified number of pairs of data elements in an adjusted computation window of the one or two buffers, each of said pairs of data elements containing an observation of an independent variable and an observation of a dependent variable, the method comprising:

initializing, by the computing-device-based computing system, a sum or a mean or both for each variable, and one or more components of simple linear regression coefficients other than a sum and a mean for a pre-adjusted computation window of size n (n≥6) of one or two buffers on the one or more storage media;

receiving, by the computing-device-based computing system, a pair of data elements to be added to the pre-adjusted computation window;

storing, by the computing-device-based computing system, the received pair of data elements into the one or two buffers;

adjusting, by the computing-device-based computing system, the pre-adjusted computation window by removing a least recently added pair of data elements from the pre-adjusted computation window and adding the to-be-added pair of data elements to the pre-adjusted computation window;

iteratively deriving, by the computing-device-based computing system, a sum or a mean or both for each variable in the adjusted computation window;

directly iteratively deriving, by the computing-device-based computing system and based at least in part on the one or more components of simple linear regression coefficients other than a sum and a mean for the pre-adjusted computation window, one or more components of simple linear regression coefficients other than a sum and a mean for the adjusted computation window, wherein directly iteratively deriving includes:
  accessing the removed pair of data elements and the added pair of data elements, wherein not all data elements in the adjusted computation window are accessed to reduce data access latency, thereby saving computing resources and reducing the computing-device-based computing system's power consumption;
  accessing the one or more components other than a sum and a mean; and
  removing any contribution of the removed pair of data elements from each of the one or more accessed components mathematically and adding any contribution of the added pair of data elements to each of the one or more accessed components mathematically wherein not all data elements in the adjusted computation window are used during the directly iteratively deriving one or more components of simple linear regression coefficients to reduce the number of operations performed by the computing-device-based computing system, thereby increasing calculation efficiency; and
generating, by the computing-device-based computing system and based on one or more of the iteratively derived components, simple linear regression coefficients for the adjusted computation window.

2. The computing-system-implemented method of claim 1, wherein the generating simple linear regression coefficients further comprises
  indirectly iteratively deriving, by the computing-device-based computing system, one or more components of simple linear regression coefficients for the adjusted computation window, wherein the indirectly iteratively deriving of the one or more components includes individually calculating each respective one of the one or more components based on one or more components other than the respective one component.

3. The computing-system-implemented method of claim 1, wherein the storing the received pair of data elements into the one or two buffers comprises storing the received pair of data elements into one or two circular buffers.

4. The computing-system-implemented method of claim 1, wherein the receiving a pair of data elements to be added to the pre-adjusted computation window includes receiving a plurality of z (z>1) pairs of data elements to be added to the computation window, and wherein the method further comprises performing, for each pair of the respective z pairs of data elements to be added, the adjusting the pre-adjusted computation window, the iteratively deriving a sum or a mean or both for each variable in the adjusted computation window, the directly iteratively deriving the one or more components other than a sum and a mean, and the generating simple linear regression coefficients for the adjusted computation window.

5. The computing-system-implemented method of claim 1, wherein the receiving a pair of data elements to be added to the pre-adjusted computation window includes receiving a plurality of z (z>1) pairs of data elements to be added to the pre-adjusted computation window, and wherein the method further comprises performing, for each pair of the respective z pairs of data elements to be added, the adjusting the pre-adjusted computation window, the iteratively deriving a sum or a mean or both for each variable in the adjusted computation window, and the directly iteratively deriving the one or more components other than a sum and a mean for the adjusted computation window.

6. The computing-system-implemented method of claim 1, wherein the accessing the removed pair of data elements and the added pair of data elements comprises accessing the removed pair of data elements and the added pair of data elements only.

7. The computing-system-implemented method of claim 4, wherein the generating simple linear regression coefficients for the adjusted computation window comprises generating simple linear regression coefficients for an adjusted computation window only when the simple linear regression coefficients are accessed.

8. The computing-system-implemented method of claim 4, wherein the generating simple linear regression coefficients for the adjusted computation window further comprises indirectly iteratively deriving, by the computing-device-based computing system, one or more components of simple linear regression coefficients for the adjusted computation window, wherein the indirectly iteratively deriving the one or more components includes individually calculating each respective one of the one or more components based on one or more components other than the respective one component.

9. A computing system, the computing system comprising:
  one or more computing devices;
  each computing device comprising one or more processors;
  one or more storage media comprising one or two buffers for storing streamed data elements from one or two data streams accessible by the computing system; and
  one or more calculation modules that, when executed by at least one of the one or more computing devices, determine simple linear regression coefficients for a specified number of pairs of data elements in an adjusted computation window of the one or two buffers, each of said pairs of data elements containing an observation of an independent variable and an observation of a dependent variable, wherein determination of the simple linear regression coefficients includes to:
  a. initialize a sum or a mean or both for each variable, and one or more components of simple linear regression coefficients other than a sum and a mean for a pre-adjusted computation window of a specified size n (n≥6), wherein the pre-adjusted computation window contains n pairs of data elements of the one or two data streams;
  b. receive a pair of data elements to be added to the pre-adjusted computation window;
  c. store the received pair of data elements into the one or two buffers;
  d. adjust the pre-adjusted computation window, wherein adjustment of the pre-adjusted computation window includes to remove a least recently added pair of data elements from the pre-adjusted computation window and to add the to-be-added pair of data elements to the pre-adjusted computation window;
  e. iteratively calculate a sum or a mean or both for each variable in the adjusted computation window;
  f. directly iteratively calculate one or more components of simple linear regression coefficients other than a sum and a mean for the adjusted computation window based at least in part on the one or more components other than a sum and a mean for the pre-adjusted computation window, wherein direct iterative calculation of the one or more components includes to remove any contribution of the removed pair of data elements from each of the one or more components mathematically and to add any contribution of the added pair of data elements to each of the one or more components mathematically without accessing and using all data elements in the adjusted computation window in order to reduce data access latency and the number of operations performed by the computing system, thereby increasing calculation efficiency, saving computing resources, and reducing the computing system's power consumption; and g. generate, based on one or more of the calculated components for the adjusted computation window, simple linear regression coefficients for the adjusted computation window.

10. The computing system of claim 9, wherein the storing the received pair of data elements into the one or two buffers comprises storing the received pair of data elements into one or two circular buffers.

11. The computing system of claim 9, wherein the one or more calculation modules, when executed by at least one of the one or more computing devices, perform b, c, d, e, and f multiple times.

12. The computing system of claim 9, wherein the one or more calculation modules, when executed by at least one of the one or more computing devices, perform b, c, d, e, f, and g multiple times.

13. The computing system of claim 9, wherein the generating simple linear regression coefficients for the adjusted computation window further comprises to indirectly iteratively calculate one or more components of simple linear regression coefficients for the adjusted computation window, wherein the indirectly iteratively calculating the one or more components includes individually calculating each respective one of the one or more components based on one or more components other than the respective one component.

14. The computing system of claim 12, wherein the performing g further comprises to indirectly iteratively calculate one or more components of simple linear regression coefficients for the adjusted computation window, wherein the indirectly iteratively calculating the one or more components includes individually calculating each respective one of the one or more components based on one or more components other than the respective one component.

15. A computing system program product for use at a configured computing system that comprises one or more computing devices, each of the computing devices comprising one or more processors, the computing system comprising one or more storage media, the one or more storage media comprising one or two data buffers for storing streamed data elements, the computing system program product for implementing a method for generating simple linear regression coefficients for a specified number of pairs of data elements in an adjusted computation window of the one or two data buffers, each of said pairs of data elements containing an observation of an independent variable and an observation of a dependent variable, the computing system program product comprising one or more non-transitory computing-device-readable storage media having stored thereon computing-device-executable instructions that, when executed by at least one of the one or more computing devices, cause the configured computing system to perform the method, the method including to:

initialize, by the configured computing system, a sum or a mean or both for each variable, and one or more components of simple linear regression coefficients other than a sum and a mean for a pre-adjusted computation window of a specified size n (n≥6) of one or two data buffers on the one or more storage media;

receive, by the configured computing system, a pair of data elements to be added to the pre-adjusted computation window;

store, by the configured computing system, the received pair of data elements into the one or two data buffers;

adjust, by the configured computing system, the pre-adjusted computation window by removing a least recently added pair of data elements from the pre-adjusted computation window and adding the to-be-added pair of data elements to the pre-adjusted computation window;

iteratively calculate, by the configured computing system, a sum or a mean or both for the adjusted computation window;

directly iteratively calculate, by the configured computing system, one or more components of simple linear regression coefficients other than a sum and a mean for the adjusted computation window based at least in part on the one or more components of simple linear regression coefficients other than a sum and a mean for the pre-adjusted computation window, including to:

access the removed pair of data elements and the added pair of data elements, wherein not all data elements in the adjusted computation window are accessed to reduce data access latency, thereby saving computing resources and reducing the configured computing system's power consumption;

access the one or more components other than a sum and a mean for the pre-adjusted computation window; and remove any contribution of the removed pair of data elements from each of the accessed components mathematically and add any contribution of the added pair of data elements to each of the accessed components mathematically without using all data elements in the adjusted computation window in order to reduce the number of operations performed by the configured computing system thereby increasing calculation efficiency; and generate, by the configured computing system, simple linear regression coefficients for the adjusted computation window based on one or more of the calculated components.

16. The computing system program product of claim 15, wherein the generating simple linear regression coefficients further comprises to indirectly iteratively calculate, by the configured computing system, one or more components of simple linear regression coefficients for the adjusted computation window, wherein indirectly iteratively calculating the one or more components includes individually calculating each respective one of the one or more components based on one or more components other than the respective one component.

17. The computing system program product of claim 15, wherein the storing the received pair of data elements into the one or two data buffers comprises storing the received pair of data elements into one or two circular buffers.

18. The computing system program product of claim 15, wherein the computing-device-executable instructions that, when executed, further cause the configured computing system to receive a pair of data elements to be added to the computation window, to store received pair of data elements into the storage media, to adjust the computation window, to iteratively calculate a sum or a mean or both for each variable in the adjusted computation window, to directly iteratively calculate the one or more components other than a sum and a mean, and to generate simple linear regression coefficients for the adjusted computation window for each of multiple pairs of data elements to be added to the computation window.

19. The computing system program product of claim 15, wherein the computing-device-executable instructions that, when executed, further cause the configured computing system to receive a pair of data elements to be added to the computation window, to store the received pair of data elements into the storage media, to adjust the computation window, to iteratively calculate a sum or a mean or both for each variable in the adjusted computation window, to directly iteratively calculate the one or more components other than a sum and a mean for each of multiple pairs of data elements to be added to the computation window.

20. The computing system program product of claim 18, wherein the computing-device-executable instructions that, when executed, cause the configured computing system to generate the simple linear regression coefficients comprise computing-device-executable instructions that, when executed, further cause the configured computing system to indirectly iteratively calculate one or more components of simple linear regression coefficients for the adjusted computation window, wherein the indirectly iteratively calculating the one or more components includes individually calculating each respective one of the one or more components based on one or more components other than the respective one component.

\* \* \* \* \*